United States Patent [19]
Makino

[11] Patent Number: 5,256,309
[45] Date of Patent: Oct. 26, 1993

[54] METHOD OF IMPROVING THE QUALITY OF LARGE AMOUNT OF WATER, AND QUANTITY OF DISSOLVED OXYGEN THEREIN

[75] Inventor: Masahiko Makino, Funabashi, Japan

[73] Assignee: Kaiyo Kogyo Kabushiki Kaisha, Tokyo, Japan

[21] Appl. No.: 798,838

[22] Filed: Nov. 25, 1991

Related U.S. Application Data

[63] Continuation of Ser. No. 461,072, Jan. 4, 1990, abandoned.

[30] Foreign Application Priority Data

| Aug. 3, 1989 | [JP] | Japan | 1-202123 |
| Sep. 25, 1989 | [JP] | Japan | 1-248522 |
| Oct. 5, 1989 | [JP] | Japan | 1-261156 |

[51] Int. Cl.$^5$ ............................................. C02F 1/58
[52] U.S. Cl. ............................ 210/721; 210/724; 210/747; 210/758; 210/906
[58] Field of Search ............. 210/702, 721, 724, 747, 210/758, 170, 242.2, 906; 261/77, 120, 121.1

[56] References Cited

U.S. PATENT DOCUMENTS

| 495,313 | 4/1893 | Dervaux | 210/702 |
| 3,470,091 | 9/1969 | Budd et al. | 210/170 |
| 3,956,124 | 5/1987 | Fast et al. | 210/758 |
| 4,226,719 | 10/1980 | Woltman | 210/758 |
| 4,436,675 | 3/1984 | Hisao et al. | 210/242.2 |
| 4,507,206 | 3/1985 | Hughes | 210/747 |
| 4,702,830 | 10/1987 | Makino et al. | 210/170 |
| 4,749,497 | 6/1988 | Kanzleiter et al. | 210/747 |
| 4,752,421 | 6/1988 | Makino | 210/242.2 |
| 4,780,217 | 10/1988 | Petersen | 210/758 |
| 4,879,046 | 11/1989 | Kojima | 210/747 |
| 4,911,838 | 3/1990 | Tanaka | 210/242.2 |

FOREIGN PATENT DOCUMENTS

| 220345 | 5/1987 | European Pat. Off. . |
| 1119186 | 12/1961 | Fed. Rep. of Germany ...... 210/721 |
| 563823 | 4/1973 | Fed. Rep. of Germany . |
| 63-398 | 1/1988 | Japan . |
| 534108 | 2/1973 | Switzerland . |

Primary Examiner—Peter Hruskoci
Attorney, Agent, or Firm—Wenderoth, Lind & Ponack

[57] ABSTRACT

The present invention relates to a method and an apparatus, in which the quality of a large amount of water and/or the quantity of dissolved oxygen in said water is improved and which are characterized in that water, in which slaked lime is dissolved in advance, and/or water of high oxygen content, which is generated in advance, is supplied into water pumped by an intermittent pneumatic water pumping unit so that the water having the slaked lime dissolved therein and/or the water of high oxygen content is diffused in the large amount of water. The present invention also relates to a method and an apparatus, in which the quality of large amount of water and/or quantity of dissolved oxygen in a large amount of water is improved and which are characterized in that water with slaked lime dissolved therein and/or water of high oxygen content is conducted to the bottom of a lake or the like; and an intermittent pneumatic water pumping unit is operated in the lake or the like so that the large amount of water is caused to flow up and down and be agitated.

7 Claims, 17 Drawing Sheets

METHOD OF IMPROVING THE QUALITY OF LARGE AMOUNT OF WATER, AND QUANTITY OF DISSOLVED OXYGEN THEREIN

This application is a continuation of now abandoned application Ser. No. 07/461,072 filed on Jan. 4, 1990.

FIELD OF THE INVENTION

The present invention relates to a method and an apparatus, in which the quality of a large amount of water in a tap water supply dam, a reservoir, a pond, a lake, a marsh, a moat, a river or the like is improved.

The present invention also relates to a method and an apparatus, in which water with slaked lime dissolved therein and/or water of high oxygen content is supplied into water pumped by an intermittent pneumatic water pumping unit and is diffused along with the diffusion and circulation of the pumped water, so that the quality of large amount of water and/or the quantity of dissolved oxygen in a large amount of water is improved. The present invention further relates to a method and an apparatus, in which water with slaked lime dissolved therein and/or water of high oxygen content is supplied into a deep layer of water of low or no oxygen content and upward and downward flows of water are caused by an intermittent pneumatic water pumping unit, so that the quality of large amount of water and/or the quantity of dissolved oxygen in a large amount of water is improved.

PRIOR ART

An intermittent pneumatic water pumping unit is conventionally used to improve the quantity of dissolved oxygen in a large amount of water, and produces a good effect. An intermittent pneumatic water pumping unit proposed by the present applicant as disclosed in the Japanese Utility Model Publication No. 3898/88 has been also used in many points of Japan and produced a high effect.

The quantity of dissolved oxygen in a large amount of water in a dam, a lake, a marsh, a pond, a sea or the like can be effectively increased by using the before mentioned intermittent pneumatic water pumping unit with relatively smaller energy. In case a dam etc. has more than 10 meters depth the overgrowth of the waterweeds can be effectively prevented by using the before mentioned intermittent pneumatic water pumping unit.

For example, the quantity of dissolved oxygen in a large amount of water comprising one million tons can be improved and the temperature of said water can be almost made uniform at any depth within a week by using only one unit of the before mentioned intermittent pneumatic water pumping unit providing a diffuser tube having 0.5 meters in diameter and 10 meters in length supplied with pressurized air at about a rate of 1 m³ an hour.

A proposal for the adjustment of pH level of tap water by slaked lime and a proposal about the prevention of corrosion of a water supply pipe by calcium have been made.

SUMMARY OF THE INVENTION

As for a large amount of water which is acidic, it is difficult to change its alkalinity. Although the dissolution of phosphorus from the ground into the large amount of water into can be suppressed by supplying oxygen through the use of the intermittent pneumatic water pumping unit, it is difficult to remove phosphorus in the large amount of water.

Also as for a large amount of water whose saturated dissolved oxygen layer has a small depth such as 30 cm to 1 m from the surface of the water, in a relatively-high-temperature area such as the tropical and the subtropical regions, or as for a mass of water whose layer of large depth such as 50 m or more has no oxygen, it is difficult to increase the quantity of dissolved oxygen only by using an intermittent pneumatic water pumping unit. Because said pumping unit operates so that water of no or low oxygen at the bottom of the large amount of water is pumped up to the surface of the water and diffused, and water of saturated dissolved oxygen content at and near the surface of the water is moved down to the bottom thereof to improve the quality of the water of no or low oxygen content at the bottom of the water. However, if the depth of the water of saturated dissolved oxygen content at and near the surface of the water is relatively small, only the other water of low oxygen content in the water moves on the whole so that it is difficult to quickly improve the quantity of the dissolved oxygen in the water. This is a problem. Particularly in the case where aerobic microorganisms are propagating at the bottom of the large amount of water to demand a large quantity of oxygen or that the large amount of water is a closed water such as a dam and a reservoir, into which much water of low or no oxygen content flows, it is likely that enough oxygen cannot be supplied by the intermittent pneumatic water pumping unit. Besides, it is likely that enough oxygen to propagate aerobic microorganisms to decompose a large quantity of organic substances deposited on the anaerobic ground under the large amount of water cannot be supplied by the intermittent pneumatic water pumping unit. This is another problem.

The present invention was made in order to solve the above problems.

According to the present invention, alkaline high concentration water with slaked lime dissolved therein or produced from caustic soda etc. is supplied into the water pumped by an intermittent pneumatic water pumping unit so that the alkaline high concentration water is effectively diffused and mixed into a large amount of water to successfully perform such improvement of the quality of the water as adjusting the pH level of the water and fix phosphorus to prevent the eutrophication of the water.

According to the present invention, water of high oxygen content or oversaturated oxygen content, which is generated in advance, is supplied into the water pumped by an intermittent pneumatic water pumping unit so that the water of high oxygen content is effectively diffused as rapidly as possible, to quickly increase the quantity of dissolved oxygen in a large amount of water successfully.

According to the present invention, water of high oxygen content is positively generated and then mixed into water flowing into a large amount of water, a layer of water of no or low oxygen content in a large amount of water, or water flowing into a closed large amount of water, and water of no or low oxygen content at and near the bottom of the large amount of water is pumped to the surface of the water by an intermittent pneumatic water pumping unit and agitated and mixed the water between the bottom and surface of water, so that the former problem is solved.

Accordingly, it is an object of the present invention to provide a method in which a large amount of water is improved in quality and which is characterized in that the alkaline high concentration water is supplied into water pumped by an intermittent pneumatic water pumping unit, so that the pH level of the large amount of water is adjusted along with the diffusion and circulation of the pumped water.

It is another object of the present invention to provide a method in which the quality of large amount of water is improved and which is characterized in that the alkaline high concentration water is supplied into water pumped by an intermittent pneumatic water pumping unit, so that a calcium and phosphorus compound is produced in said large amount of water and the pH level thereof is adjusted, along with the diffusion and circulation of the pumped water.

It is yet another object of the present invention to provide a method in which the quality of large amount of water is improved and which is characterized in that the water is injected into a dissolution vessel containing slaked lime; and water with a calcium dissolved therein is taken out from said vessel and supplied into water pumped by an intermittent pneumatic water pumping unit, so that the pH level of the large amount of water is adjusted along with the diffusion and circulation of the pumped water.

It is yet another object of the present invention to provide a method in which a large amount of water is improved in quality at any depth or at specific depth layer and which is characterized in that the alkaline high concentration water is supplied into water pumped by multi stage intermittent pneumatic water pumping unit, so that the pH level of the large amount of water at any depth or at specific depth layer is adjusted along with the diffusion and circulation of the pumped water.

It is yet another object of the present invention to provide a method in which the pH level of the large amount of water is adjusted at the shallow depth layer and/or deep depth layer.

It is yet another object of the present invention to provide a method in which a large amount of water is improved in quality and which is characterized in that slaked lime is disposed in spouted water pumped by an intermittent pneumatic water pumping unit; and water with a high concentration of the slaked lime dissolved therein is mixed into the large amount of water along with the diffusion and circulation of the pumped water as the pumped water is caused to flow and circulate.

It is yet another object of the present invention to provide a method in which the quantity of dissolved oxygen in a large amount of water is improved and which is characterized in that water of low or no oxygen content is taken out from the large amount of water in a river or a closed water reservoir and changed into water of high oxygen content in advance; and the water of high oxygen content is supplied into water pumped by an intermittent pneumatic water pumping unit, so that the water of high oxygen content is diffused into the large amount of water along with the diffusion and circulation of the pumped water.

It is another object of the present invention to provide a method in which the quantity of dissolved oxygen in a large amount of water is improved and which is characterized in that water of low or no oxygen content is taken out from the large amount of water in a river or a closed water reservoir and changed into water of high oxygen content in advance; the water of high oxygen content is supplied into the low-or-no-oxygen-content portion of the large amount of water; and the large amount of water is discontinuously caused to flow up and down and circulate, by an intermittent pneumatic water pumping unit.

In the before mentioned objects of the present invention, an intermittent pneumatic water pumping unit comprises the upper and lower water pumping cylinders, and water pumping action is conducted on the upper water pumping cylinder and/or the lower water pumping cylinder. To generate the water of high oxygen content, air of high oxygen content of about 80% is blown into the water of low or no oxygen content taken out from the large amount of water.

It is yet another object of the present invention to provide a method in which the quality of a large amount of water and the quantity of dissolved oxygen in said water are improved and which is characterized in that water with slaked lime dissolved therein and water of high oxygen content, which is generated in advance, are supplied into water pumped by an intermittent pneumatic water pumping unit so that the water with the slaked lime dissolved therein and the water of high oxygen content are diffused in the large amount of water along with the diffusion and circulation of the pumped water to adjust the pH level of the large amount of water and improve the quantity of dissolved oxygen therein.

It is yet another object of the present invention to provide a method in which the quality of a large amount of water and the quantity of dissolved oxygen in said water are improved and which is characterized in that water with slaked lime dissolved therein and water of high oxygen content, which is generated in advance, are supplied into water pumped by an intermittent pneumatic water pumping unit so that the water with the slaked lime dissolved therein and the water of high oxygen content are diffused in the large amount of water along with the diffusion and circulation of the pumped water to produce a calcium and phosphorus compound in the large amount of water and to adjust the pH level thereof and to improve the quantity of dissolved oxygen in said water.

It is yet another object of the present invention to provide a method in which the quality of a large amount of water and the quantity of dissolved oxygen in said water are improved and which is characterized in that water is injected into the lower a dissolution vessel containing slaked lime; and water with calcium dissolved therein taken out from said vessel; and said water with calcium dissolved therein and water of high oxygen content, which is generated in advance, are supplied into the water pumped by an intermittent pneumatic pumping unit.

It is yet another object of the present invention to provide an apparatus which is for improving the quality of water and is characterized in that the downstream end of a water feed pipe is connected to the lower portion of a dissolution vessel containing slaked lime; the upstream end of water conveyance pipe is connected to the upper portion of said vessel; and the downstream end of said water conveyance pipe is connected to the water suction cylinder of an intermittent pneumatic water pumping unit.

It is yet another object of the present invention to provide an apparatus which is for improving the quality of water and is characterized in that the downstream end of a water feed pipe is connected to the lower portion of a dissolution vessel containing slaked lime, the upperstream end of water conveyance pipe is connected to the upper portion of said vessel; and the downstream end of said water conveyance pipe is connected to all or some water pumping cylinders of multi stage intermittent pneumatic water pumping unit.

It is yet another object of the present invention to provide an apparatus which is for improving the quality of water and is characterized in that a water-passable container containing a slaked lime is disposed in spouted water pumped by an intermittent pneumatic water pumping unit in which an air chamber is provided under the water pumping cylinder for supplying a specific volume of air into the water pumping cylinder at specific interval. Since the solubility of slaked lime to water is 1,600 mg/l or 0.16% at the temperature of 20°., a large quantity of slaked lime put in a dissolution vessel or a large quantity of slaked lime block put in the water-passable container can be dissolved at the constant rate in the water without causing a hindrance. For that reason, the management of the apparatus is easy. For example, if a large quantity of slaked lime is put in the dissolution vessel or the water-passable container and the water is passed through the vessel or container, calcium is gradually dissolved in the water, continuously in a nearly constant state until the slaked lime is completely dissolved. For that reason, the dissolution takes place steadily without automatic control. Since 10 to 30 mg/l of slaked lime is needed for the adjustment of the pH level of water in an ordinary tap water dam or the like, the quality of such water whose amount is about 50 to 160 times as much as that of the water containing a high concentration of the slaked lime which is dissolved at 1,600 mg/l as mentioned above can be improved by the present method and apparatus. Since 50 to 100 mg/l of slaked lime is needed for the removal of phosphorus from the water in the ordinary tap water dam or the like, the quality of such water whose amount is about 32 to 16 times as much as that of the water containing the high concentration of the slaked lime which is dissolved at 1,600 mg/l as mentioned above can be improved by the present method and apparatus.

When the water containing a high concentration of slaked lime is to be generated in advance in the methods provided in accordance with the present invention, the quantity of the water needs to correspond to that of the water to be processed for improving its quality. For example, the amount of the water containing the high concentration of slaked lime needs to be 10,000 tons for 1,000,000 tons of the water to be processed. However, the water containing a high concentration of slaked lime is generated by using the water taken out of the water to be processed. For that reason, the improvement can be smoothly and surely performed.

Since the water-passable container containing a slaked lime is disposed in a pumped water diffusion area above the pumping unit in the apparatus provided in accordance with the present invention, the management of the apparatus is easy.

Once the quality of the water is improved in each of the methods and the apparatuses provided in accordance with the present invention, only the quality of water flowing into the former water is improved for improving and maintaining the quality of a large amount of water. For that reason, the cost of operation in each of the methods and the apparatuses nearly corresponds to the amount of the water flowing into the former. Besides, problems based on eutrophication are solved.

Although the capacity of each of the intermittent pneumatic water pumping units in the methods and the apparatus provided in accordance with the present invention depends on the amount of the processed water, the cross-sectional form of a dam or the like containing it, and the manners of the inflow and outflow of the water to and from the dam or like, the pumping unit needs to have one water pumping cylinder of 50 cm in diameter for 1,000,000 tons of the processed water.

As a result of an experiment, it has been confirmed that water diffuses and circulates almost uniformly even if the horizontal form of the dam or the like is complicated or the distance between the shore of the dam or the like and the installed position of each of the apparatuses provided in accordance with the present invention is as large as 1,000 m or more. Therefore, the water with the slaked lime dissolved therein diffuses and circulates so that the quality of all the water in the dam or the like is improved.

Although, the before mentioned alkaline high concentration water is produced by dissolving slaked lime into water, any other method to produce alkaline high concentration water from any other alkaline chemicals may be adopted.

It is yet another object of the present invention to provide an apparatus which is form improving the quantity of dissolved oxygen in a large amount of water and is characterized in that a high-oxygen-content water feeder is connected to a high-oxygen-content water generator to which a water intake means is connected; and the water feed means of the feeder is connected to the water suction cylinder of an intermittent pneumatic water pumping unit.

It is yet another object of the present invention to provide an apparatus which is for improving the quantity of dissolved oxygen in a large amount of water and is characterized in that a high-oxygen-content water feeder is connected to a high-oxygen-content water generator to which a water intake means is connected; and the water feed means of the feeder is connected to all or some water pumping cylinders of multi stage intermittent pneumatic water pumping unit.

It is yet another object of the present invention to provide an apparatus which is for increasing the quantity of dissolved oxygen in a large amount of water and is characterized in that a water dispersion means located at the side of inflow of water to the large amount of water, a high-oxygen-content water generator, a low-oxygen-content water intake means and an intermittent pneumatic water pumping unit are connected to each other.

The low-oxygen-content water intake means in each of the apparatuses is composed of a pump, a water suction pipe connected to the pump, and a discharge pipe connected to the pump. The water feed means in the former apparatus is composed of a pump and a water conveyance pipe.

In each of the apparatuses, the water of high oxygen content is generated by blowing air of high oxygen content of about 60%-90% into water of low or no oxygen content, in low oxygen content the concentration of dissolved oxygen is no more than 1 mg/l. And the large amount of water to be processed is caused to discontinuously flow up and down and to circulate by the intermittent pneumatic water pumping unit as a prime mover.

In each of the apparatuses, the high-oxygen-content air generator is made of a generation cylinder which is filled with a nitrogen absorbent such as zeolite and has an air feed port in one side of the cylinder and a high-oxygen-content air takeout port in another side of the cylinder and said generation cylinder is connected to a water processing vessel through said high-oxygen-content air takeour port. Nitrogen in air is adsorbed by the nitrogen adsorbent so that air of high oxygen content is generated. The air of high oxygen is blown into the water of no or low oxygen content so that the water of high oxygen content is generated. The water of high oxygen content is supplied to the water pumped by an intermittent pneumatic water pumping unit which is installed at an appropriate portion of a lake, a pond or the like and diffused into the water therein as the water is flowed and circulate between the bottom and surface by the intermittent pneumatic water pumping unit so that the quantity of dissolved oxygen is improved. The quantity of dissolved oxygen in the water in the lake, the pond or the like, after the before mentioned improvement process, can have the oxygen content of the water at about 5 mg/l. The air of high oxygen content, in the present invention, has an oxygen concentration at about 60%-90%. And a nitrogen absorbent, in the present invention, is every variety of zeolite.

It is yet another object of the present invention to provide an apparatus in which the quantity of dissolved oxygen in a large amount of water and the quality of said water are improved and is characterized in that the downstream end of a water feed pipe for supplying water of high oxygen water is connected to the water pumping cylinder of an intermittent pneumatic water pumping unit; also the downstream end of a water feed pipe for supplying water with slaked lime dissolved therein is connected to the water pumping cylinder.

In each of the before mentioned apparatuses, the intermittent pneumatic water pumping unit is made of a single water pumping cylinder, a plurality of water pumping cylinders, a multi stage construction such as combination of upper and a lower water pumping cylinders or a multi stage intermittent pneumatic water pumping unit such as comprises an upper unit and lower unit. The water pumping cylinder of the intermittent pneumatic water pumping unit in each of the apparatuses is about 30 cm to 80 cm in diameter and about 5 m to 30 m in length, and may be substituted by a plurality of water pumping cylinders bundled together to obtain the same performance such as obtained by an intermittent pneumatic water pumping unit having a water pumping cylinder of 1 m to 3 m in diameter. Also, the water pumping cylinder may be substituted by a combination of upper and lower cylinders, in which an upper water pumping cylinder for circulating the shallow portion of the water and a lower water pumping cylinder for circulating the deep portion of the water. Further, the upper intermittent pneumatic water pumping unit and the lower intermittent pneumatic water pumping unit are combined in vertically through a separator, and the shallow and deep portion are circulated by respective unit. In these cases, water with slaked lime dissolved therein and/or water of high oxygen content may be supplied either into only the lower pumping cylinder or into both the upper and the lower water pumping cylinders.

According to the present invention, slaked lime is dissolved in water so that the alkaline high concentration water. And said water is then diffused in the large amount of water along with the diffusion and circulation of the pumped water to be processed for improving quality and mixed therewith. The alkaline high concentration water can thus be easily mixed with the water to be processed to quickly and uniformly set the mixture at a concentration such as a pH level of about 7. The slaked lime placed on the water passage is gradually dissolved in the water, continuously in a constant state without any management of the amount of dissolution, since slaked lime can be dissolved in the water at the constant rate. The pH level of the processed water can thus be adjusted through the use of the slaked lime to prevent the corrosion of an iron pipe or the like. Since calcium dissolved from the slaked lime into the water combines with dissolved phosphorus or the like to form an insoluble deposit, the quantity of the dissolved phosphorus or the like is greatly reduced to decrease the eutrophication of the processed water.

The present invention can be effectively applied to improve a quality of water of a pond, a like, or the like where a water is under the influence of acid rain sot hat is not inhabitable for fishes. If the present invention is applied to a dam, a lake or the like having a considerable depth, the quality of water of their place can be improved effectively and rationally by conducting only the upper layer of water, or conducting the upper and lower layer of water respectively.

According to the present invention, water of high oxygen content is supplied into water, pumped by an intermittent pneumatic water pumping unit so that the water of high oxygen content diffuses along with the diffusion and circulation of the pumped water. If the pumping unit is a two-stage pumping unit having an upper and a lower water pumping cylinders and the water of high oxygen content is supplied into only the lower water pumping cylinder, the quantity of dissolved oxygen in only a deep layer of water can be quickly improved.

According to the present invention, water of high oxygen content is sent to the bottom of a lake or the like and upward and downward flows of water are caused by an intermittent pneumatic water pumping unit, so that water of no or low oxygen content is quickly changed into water of enough oxygen content to enable fishes and so forth to live in the lake or the like, and aerobic microorganisms on the ground of the lake or the like propagate to decompose organic substances to prevent the generation of harmful gas and the dissolution of nutrients into the water. After the decomposition of the organic substances on the ground of the lake or the like is completed, the consumption of oxygen is drastically reduced. Therefore, the supplied quantity of the water of high oxygen content can be diminished after a certain period of time. If green algae propagates in the lake or the like, it is conceivable that the algae supply oxygen to make it possible to obtain a necessary quantity of dissolved oxygen in the lake or the like only through the operation of a pumping unit after the decomposition of the organic substances is completed.

The present invention can be effectively applied to a watery place where the depth of the high-oxygen-content layer of water at and near the surface of the water is small as in the lake, pond or the like of the tropical and subtropical regions. For example, the depth of the high-oxygen-content layer of water in a lake located at the Amazon river and being 100 m in depth and 500,000,000 tons in water amount is about 30 cm to 1 m, and that of the no-oxygen-content layer of the water is overwhelmingly large. For that reason, it is nearly impossible to increase the quantity of dissolved oxygen in the water of the lake only by an intermittent pneumatic water pumping unit. However, according to the present invention, the quantity of dissolved oxygen in the water of the entire lake can be relatively easily increased to 5 mg/l, for example.

DESCRIPTION OF PREFERRED EMBODIMENTS (Embodiment 1)

Figure 1:
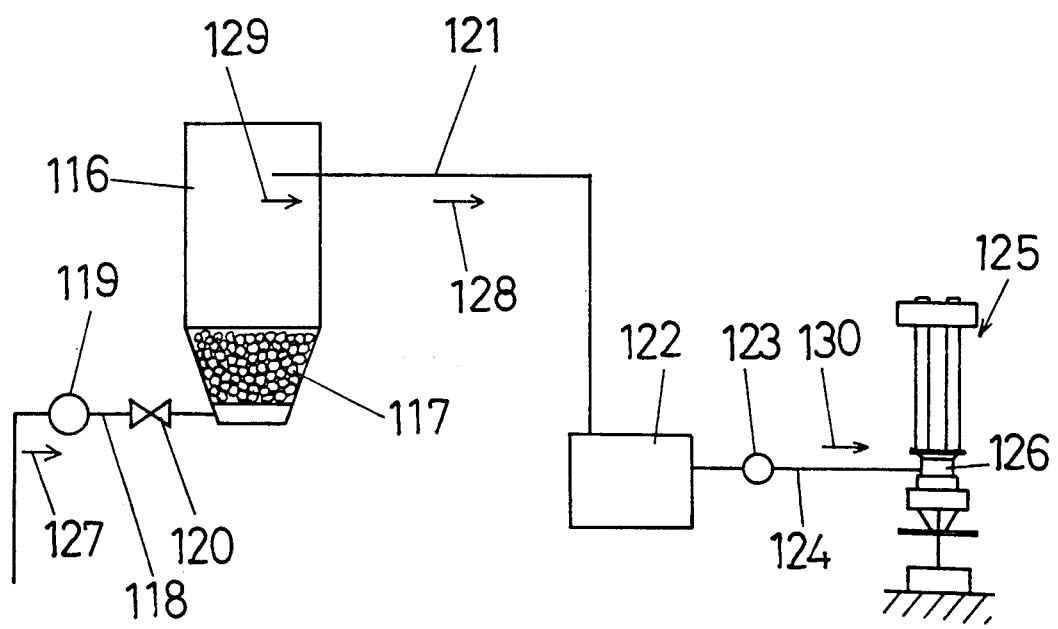
FIG. 1 is a diagrammatic view for describing the feed of alkaline high concentration water in an embodiment of the present invention.
Figure 2:
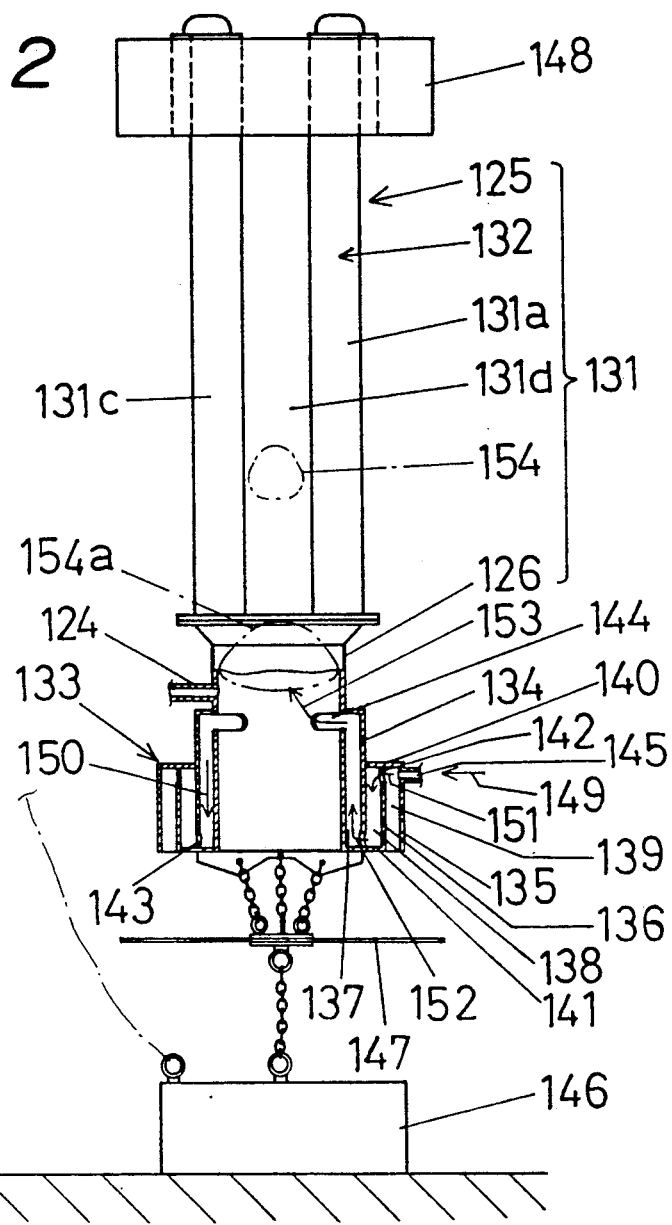
FIG. 2 is an enlarged cutaway front view of an intermittent pneumatic water pumping unit in the embodiment.
Figure 3:
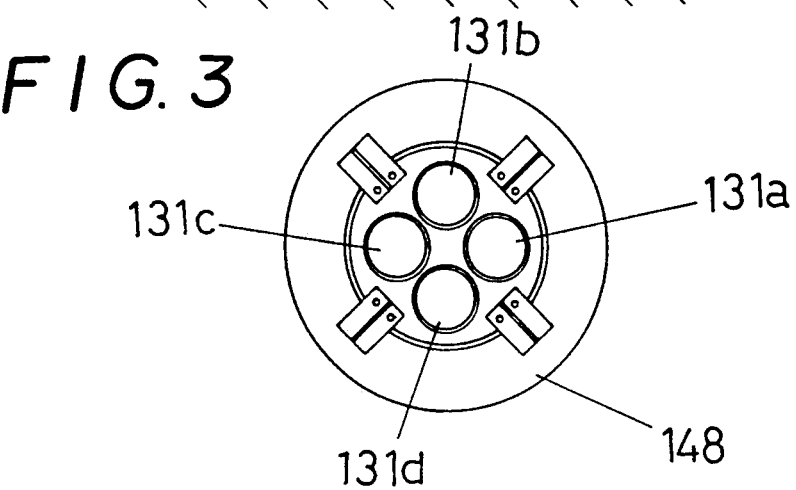
FIG. 3 is a plan view of the water pumping unit shown in FIG. 2.

An embodiment of the present invention is hereafter described with reference to FIGS. 1, 2, 3 and 4. In the embodiment, slaked lime 117 is filled in the lower portion of a dissolution vessel 116 in such a manner that water-passable containers containing the slaked lime are appropriately piled up in the vessel, for example. A water feed pipe 118 is connected to the lower portion of the vessel 116. A pump 119 and a valve 120 are provided in the pipe 118. The upstream end of a conveyance pipe 121 is connected to the upper portion of the dissolution vessel 116. A solution tank 122 is connected to the downstream end of the conveyance pipe 121. The upstream end of a water transfer pipe 124, in which a pump 123 is provided, is connected to the solution tank 122. The downstream end of the water transfer pipe 124 is connected to the water suction cylinder 126 of an intermittent pneumatic water pumping unit 125. When the pump 119 is rotated so that water is pumped up from a dam, for example, and sent to the dissolution vessel 116 as shown by an arrow 127 in FIG. 1, the water passes through the slaked lime 117 and accumulates in the vessel. The supernatant portion of the accumulated water in the vessel 116 is taken out therefrom through the conveyance pipe 121 as shown by an arrow 128 in FIG. 1. If the position of the supernatant portion of the water is higher than that of the solution tank 122, a pump for sending the supernatant portion to the tank is not needed. If the dissolution vessel 116 is hermetically sealed, the supernatant portion of the water therein is automatically moved into the transfer pipe 121 due to the action of the pump 119 as shown by an arrow 129 in FIG. 1. The water thus transferred into the solution tank 122 is sent to the water suction cylinder 126 by the pump 123 as shown by an arrow 130 in FIG. 1.

Figure 4:
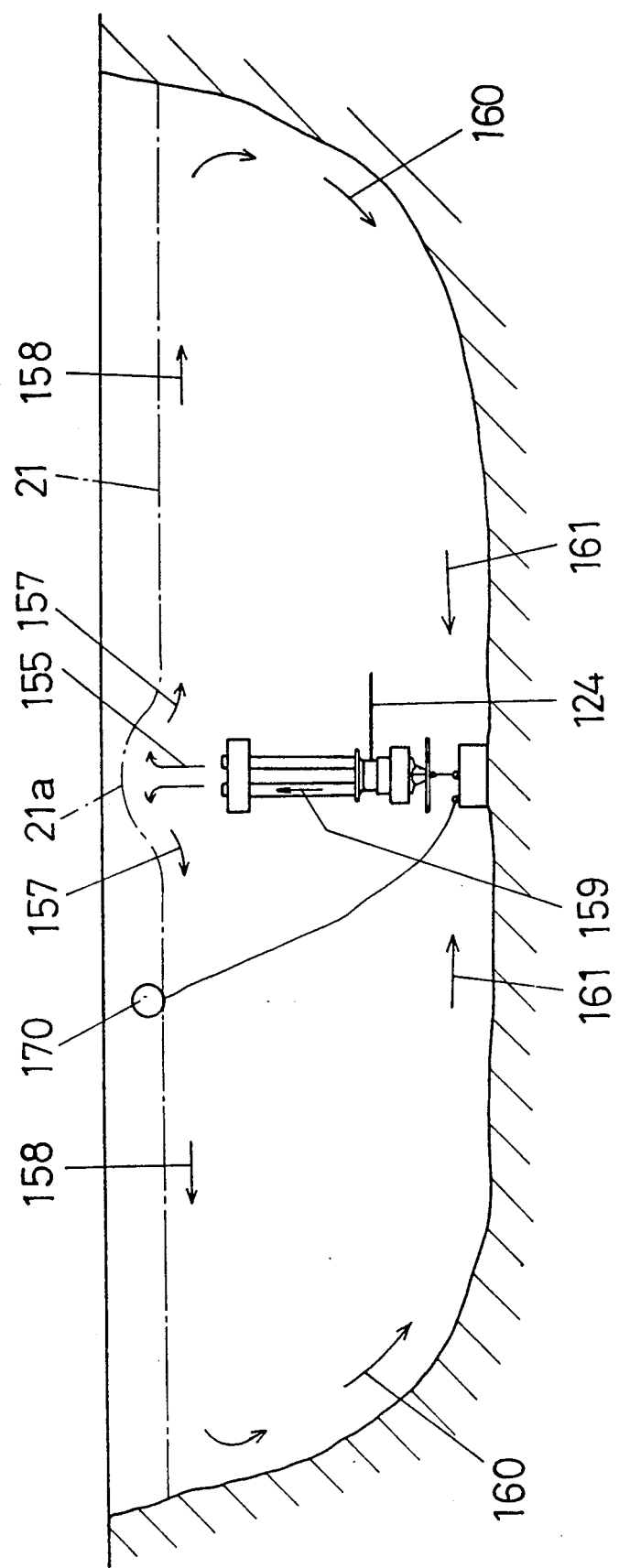
FIG. 4 is a view for describing the installation of equipment in the embodiment shown in FIG. 2.

The water pumping cylinder 131 of the intermittent pneumatic water pumping unit 125 is composed of a combination 132 of four mutually bundled cylinders 131a, 131b, 131c and 131d, and the single water suction cylinder 126 connected to the lower end of the combination. The water transfer pipe 124 is connected to the water suction cylinder 126. The water pumping unit 125 has an air chamber 133 outside the lower portion of the water suction cylinder 126. An inner cylinder 134 is movably fitted with a prescribed gap outside the water suction cylinder 126, an outer cylinder 135 is movably fitted with a prescribed gap outside the inner cylinder, and a partition cylinder 136 is fitted between the inner and the outer cylinders, so that the air chamber 133 is formed. The space 137 between the water suction cylinder 126 and the inner cylinder 134, the space 138 between the inner cylinder 134 and the partition cylinder 136 and the space 139 between the partition cylinder 136 and the outer cylinder 135 are covered at the upper ends of the spaces with a top plate 140. The spaces 137 and 138 are closed at the lower ends thereof with a closure plate 141. Water passage holes 142 and 143 are provided in the upper portion of the partition cylinder 136 and the lower portion of the inner cylinder 134, respectively, so that the spaces 137, 138 and 139 communicate with each other through the holes. The space 137 communicates with the interior of the water suction cylinder 126 through a water passage hole 144. An air feed hose 145 for supplying pressurized air, a weight 146, a cover plate 147 for preventing sludge or the like from entering into the water pumping cylinder 131 as the sludge or the like is agitated up from the ground of the dam or the like, and a float 148 are provided. Since the intermittent pneumatic water pumping unit 125 is hung by the buoyancy of the float 148 secured to the outside of the upper portion of a combination 132 of four mutually bundled cylinders and pulled downward by the weight 146, the pumping unit is always in a vertical free floating posture as shown in FIG. 4. Shown at 170 in FIG. 4 is a float indicative of the installed place of the pumping unit 125. When the pressurized air is continuously supplied to the air chamber 133 as shown by an arrow 149 in FIG. 2, the air accumulates in the chamber starting with the upper portion thereof, to push down the level of water in the chamber as shown by an arrow 150 in FIG. 2. When the level of water is pushed down to the water passage holes 143, the air enters into the water suction cylinder 126 through the water passage holes 142, 143, 144 as shown by arrows 151, 152 and 153, so that the air forms a large bubble 154a, which ascends and is then divided into bubbles 154 in the four cylinders 131a, 131b, 131c and 131d in which the bubbles ascend. The water under the bubbles 154a and 154 is pulled up by the buoyancy of the bubbles, and the water over them is pushed up by the buoyancy. The pumped-up water spouts out of the upper end of the mutually bundled water pumping cylinders 132, lifts the surface 21 of the water of the dam as shown by arrows 155 in FIG. 4, forms convex surface 21a, and thereafter descends as shown by arrows 157 therein, so that the water horizontally diffuses as shown by arrows 158 therein. The water of high slaked lime content, which is supplied into the water suction cylinder 126, mixes with the water pumped up by the pumping unit 125, so that the mixed water ascends in the water pumping cylinder 131 as shown by an arrow 159 in FIG. 4 and quickly mixes with the water between the upper end of the cylinder and the surface 21 of the water of the dam. At that time, the quickly mixed water is pushed up to the protruded surface 21a of the water of the dam, and then diffuses a shown by the arrows 157 in FIG. 4. A mixed water ascends before reaching the surface 21 of the water, and mixed water diffuses the depth of 1 m to 3 m, for example, under the surface 21 of the water of the dam, reaches the shore or the dam, and descends as shown by arrows 160, 161 in FIG. 4.

In generally, the temperature of the water pumped up through the water pumping cylinder is lower than that of the water near the surface. However, the water spouted out of the top of water pumping cylinder joints and mixes with a lots of the intermediate water located between the surface 21 and the bottom, so that the temperature of mixed water becomes nearly that of the water near the surface. And the temperature rises further when it is scattered as shown by arrows 158, and so there is no difference in temperature between it and surface water. Accordingly, the specific weight difference becomes smaller, which causes the mixed water to scatter transversely, not to descend as shown by arrows 158.

Although the water pumping cylinder 131 of the intermittent pneumatic water pumping unit 125 is composed of the four mutually bundled cylinders and the water suction cylinder under thereof in this embodiment, the present invention is not confined thereto but may be otherwise embodied so that the water pumping cylinder is composed of a single cylinder and a water suction cylinder or composed of an upper and a lower water pumping cylinders.

Although the water having the slaked lime dissolved therein is supplied to the water suction cylinder 126 constituting the lower portion of the water pumping cylinder 131, in this embodiment, the present invention is not confined thereto but may be otherwise embodied so that a short cylinder provided with a feeder for supplying the lower end of the water pumping cylinder with the water having the slaked lime dissolved therein is connected to the lower end of the water pumping cylinder, similarly to the embodiment 4, also may be otherwise embodied so that the water having the slaked lime dissolved therein is supplied into the middle-height portions of water pumping cylinder.

Also, the water having the slaked lime dissolved therein may be supplied through any intermediate portion of the water pumping cylinder between the top and the bottom.

Further, the water having the slaked lime dissolved therein in the present embodiment alternatively changed to the water of high oxygen content.

(Embodiment 2)

Figure 5:
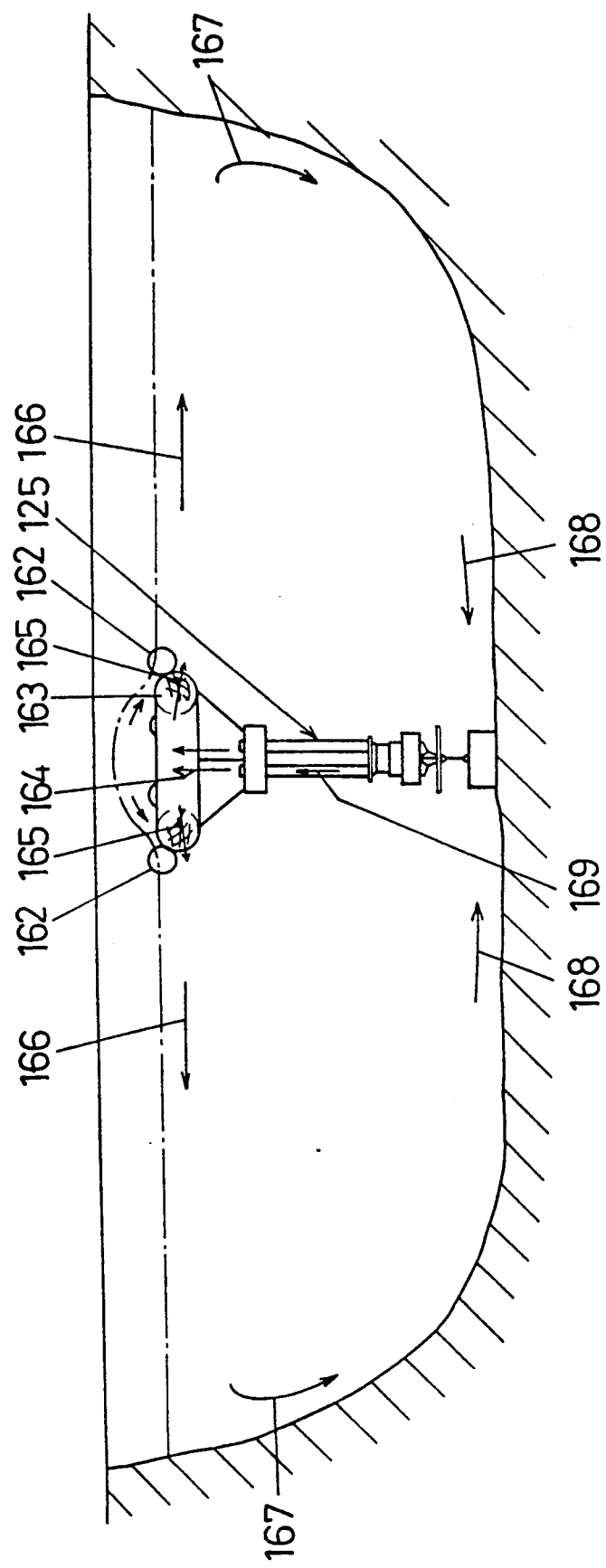
FIG. 5 is a view for describing the installation of equipment in the another embodiment of the present invention.

Another embodiment of the present invention is hereafter described with reference to FIG. 5. In the embodiment, a water-passable container 163 is held by floats 162 over an intermittent pneumatic water pumping unit 125, and slaked lime is provided in the container 163. When pressurized air is supplied into the air chamber of the pumping unit 125, water spouted up from the unit as shown by arrows 164 in FIG. 5 mixes with water at and near the surface of water of a dam or the like, similarly to the embodiment 1, and passes through and around a water-passable container 163 dissolving the slaked lime, so that the mixed water with slaked lime dissolved therein diffuses as shown by arrows 165 and 166 in FIG. 5 and descends as shown by arrows 167. The mixed water thereafter moved on the ground of the dam or the like as shown by arrows 168 in FIG. 5, and then ascends again as shown by an arrow 169. For these reasons, water in which the slaked lime is dissolved at a high concentration is quickly diffused and mixed along with thereof in the dam or the like, similarly to the embodiment 1.

In this embodiment, alkaline concentration can not be controlled as it be conducted in the embodiment 1, because the alkaline high concentration water is produced by dissolving the slaked lime in a water-passable container 163 by the water spouted out of the top of unit in this embodiment. And the alkaline concentration of the mixed water becomes low in case a lot of water is passed through and around a water-passable container 163. However, the water is spouted out of the top of unit intermittently over and over again, so that the efficiency of this embodiment is not lowered.

(Embodiment 3)

The yet another embodiment of the present invention is hereafter described with reference to FIGS. 7, 8, 9 and 10.

Figure 9:
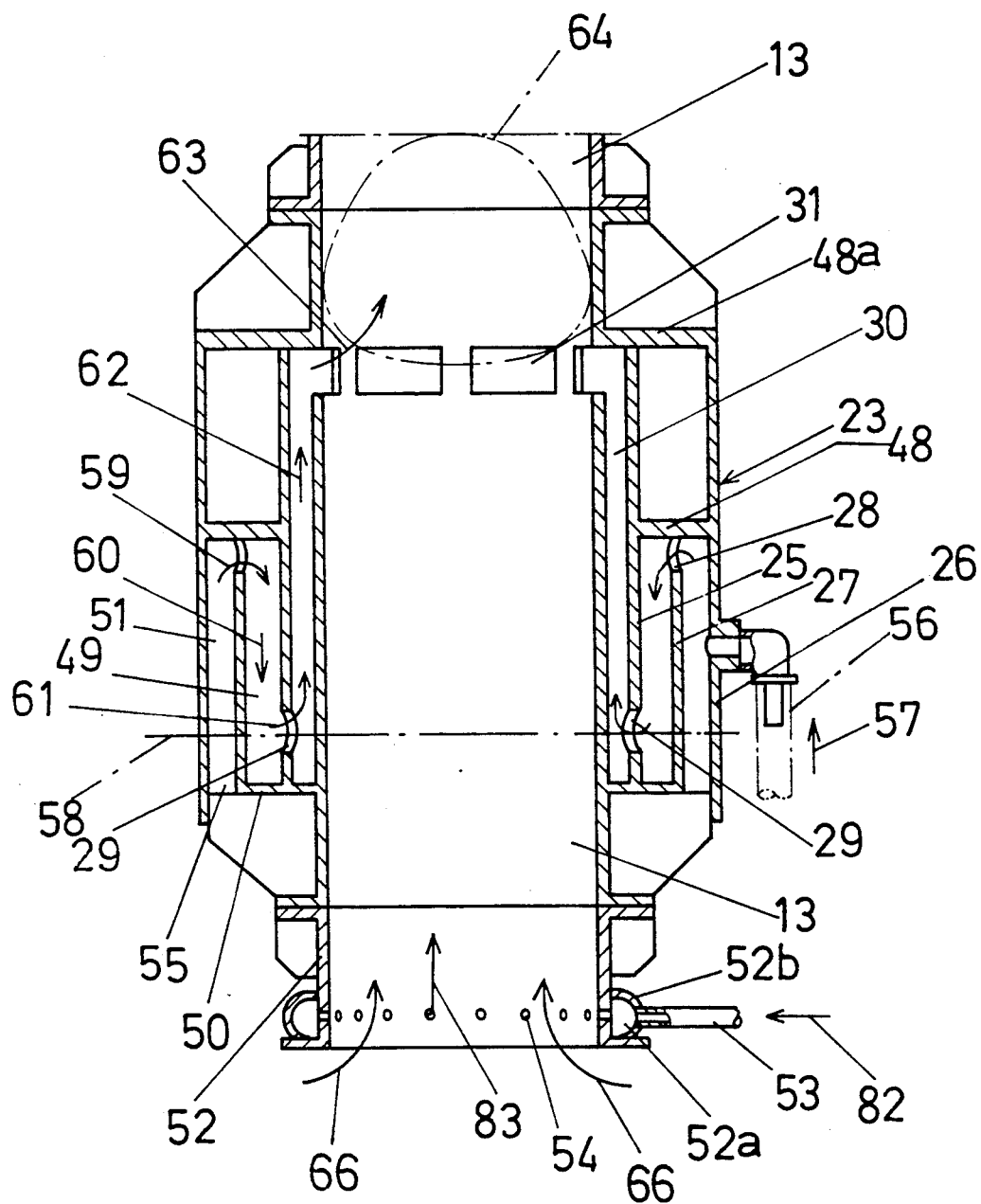
FIG. 9 is an enlarged sectional view of the lower air chamber of the water pumping unit of FIG. 7.

In this embodiment, the upper layer and the lower layer of the water in a dam, a lake, a pond or the like is improved respectively. And the upper water pumping cylinder and the lower water pumping cylinder are combined in vertically through a separator. In FIG. 9, an air chamber 23 is provided outside the lower portion of the lower water pumping cylinder 13. The lower end of the upper water pumping cylinder 20 is connected to the upper portion of the lower water pumping cylinder 13, through a separator 24. A short cylinder 52 provided with an alkaline high concentration water feeder 52a is connected to the lower end of the lower water pumping cylinder 13. An inner cylinder 25 is movably fitted outside the lower portion of the lower water pumping cylinder 13. An outer cylinder 26 is movably fitted outside the inner cylinder 25 so that a prescribed gap is kept between them. A partition cylinder 27 is provided between the inner and the outer cylinders 25 and 26. Water passage holes 28 and 29 are provided in the lower portion of the inner cylinder 26 and the upper portion of the partition cylinder 27, respectively. The air chamber 23 is thus formed. Water passage holes 31 are provided in the lower water pumping cylinder 13 at the upper portion of the space 30 between the cylinder 13 and the inner cylinder 25. The upper end of the air chamber 23 is closed with a top plate 48a. The lower end of the space 30 and that of the space 49 between the inner cylinder 25 and the partition cylinder 27 are closed with a closure plate 50. The lower end of the space 51 between the partition cylinder 27 and the outer cylinder 26 is an opening 55 communicating with the outside water. The alkaline high concentration water feeder 52a has an annular cover 52b outside the short cylinder 52. A water feed pipe 53 is connected to the outer portion of the annular cover 52b. A plurality of small water passage holes 54 are provided at equal intervals in the short cylinder 52 inside the annular cover 52a. Shown at 56 in FIG. 9 is an air feed hose for sending pressurized air continuously to the air chamber 23.

Figure 7:
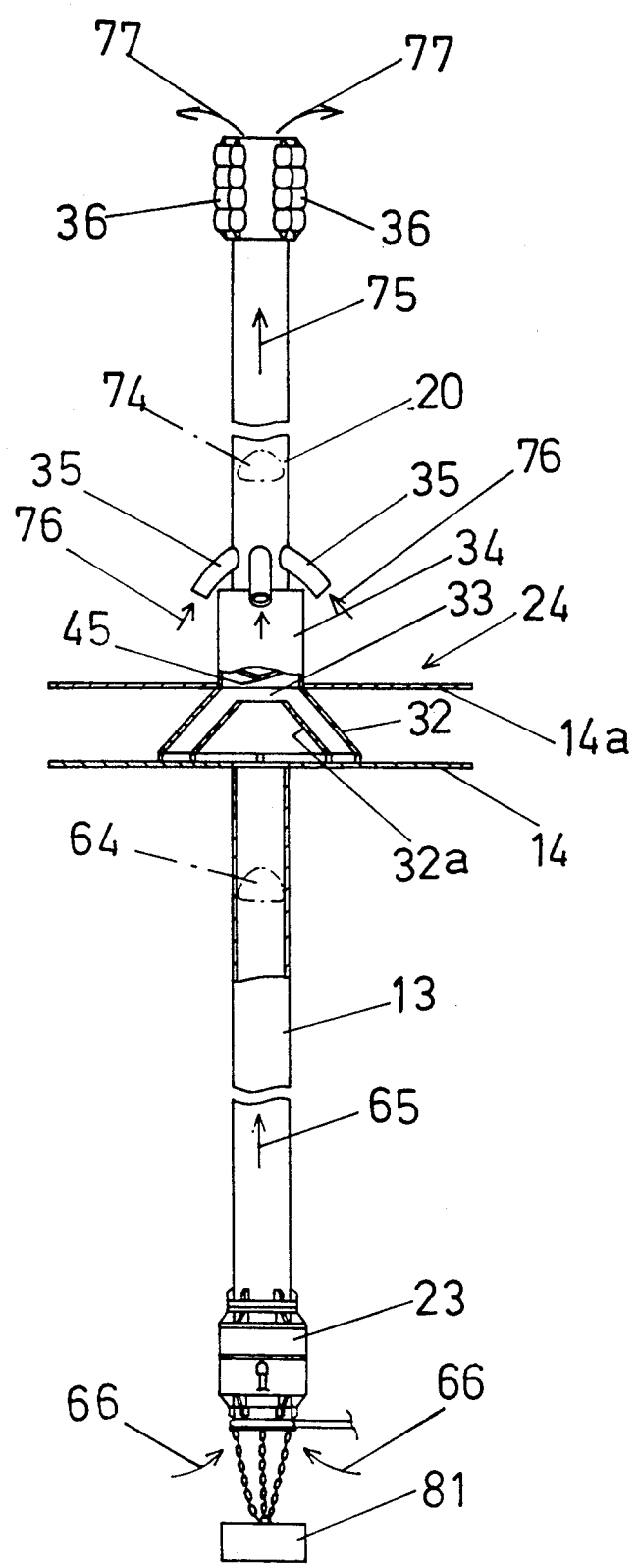
FIG. 7 is a cutaway front view of an intermittent pneumatic water pumping unit in yet another embodiment of the present invention.
Figure 8:
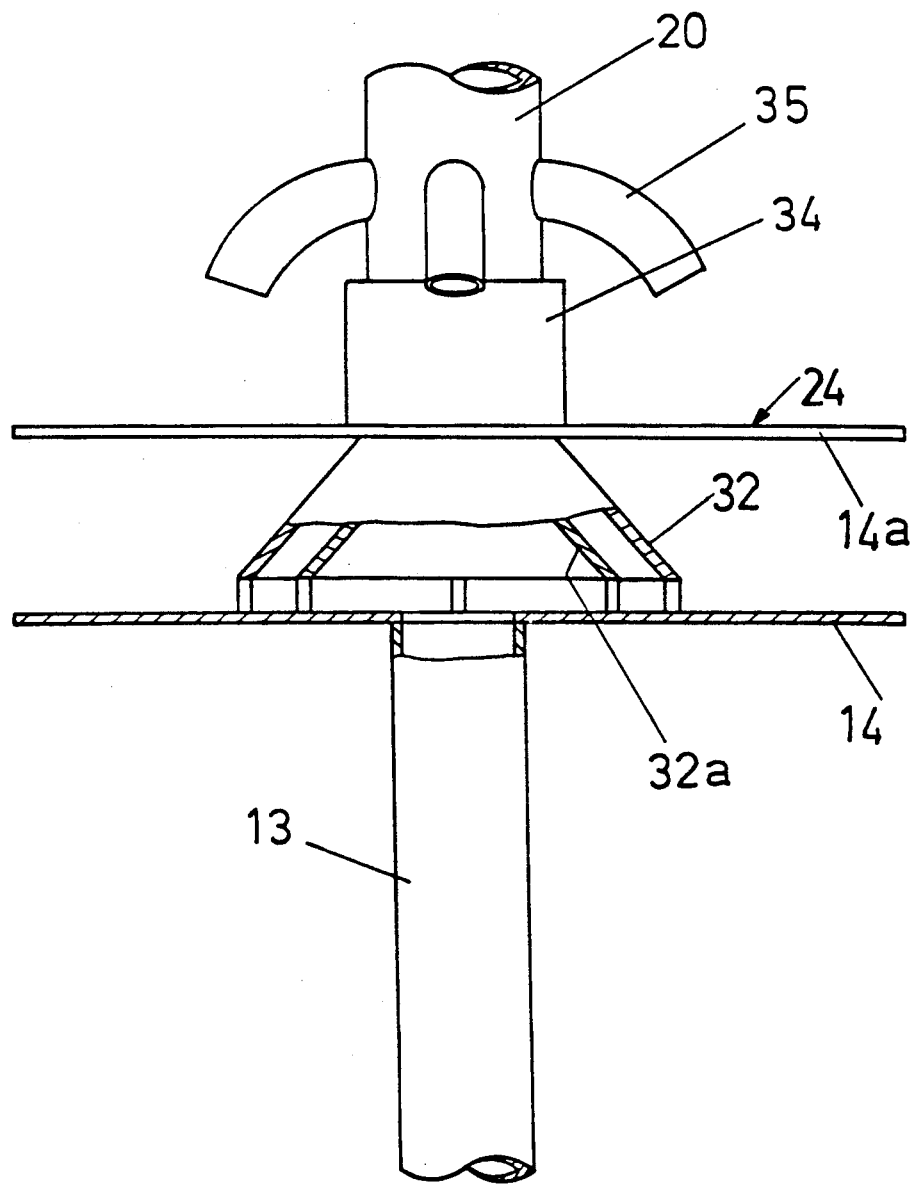
FIG. 8 is an enlarged cutaway front view of the connection part of the upper and lower water pumping cylinders of the water pumping unit of FIG. 7.

As shown in FIG. 7, the guide plate 14 horizontally and circularly extends with a prescribed length outward from the upper end of the lower water pumping cylinder 13. Separation plates 32 and 32a each shaped as a truncated cone are provided over the guide plate 14 so that a prescribed small gap is kept between the separation plates 32, 32a. The guide plate 14a is provided over the separation plates 32 and 32a so that the guide plate 14a extends outward similarly to the other guide plate 14. An air chamber 34 is provided over the guide plate 14a, and communicates with a water passage hole 33, in FIG. 7. The lower end of the upper water pumping cylinder 20 is connected to the upper portion of the air chamber 34, in FIG. 10. A plurality of water suction pipes 35 are upwardly connected to the upper water pumping cylinder 20, and floats 36 are attached to the upper portion of the cylinder 20, in FIG. 7.

Figure 10:
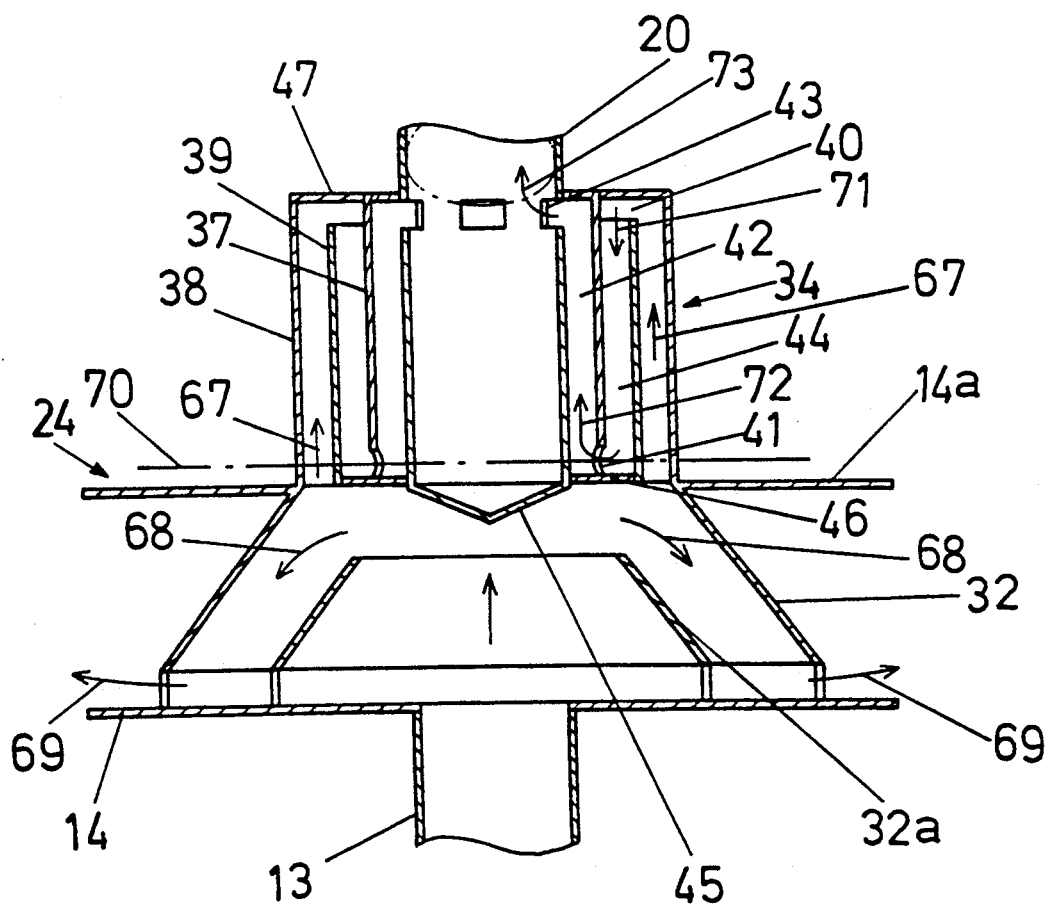
FIG. 10 is an enlarged sectional view of the upper air chamber of the water pumping unit of FIG. 7.

As shown in FIG. 10, an inner and an outer cylinders 37 and 38 are movably fitted outside the lower portion of the upper water pumping cylinder 20 so that a prescribed gap is kept between the inner and the outer cylinder 37, 38. A partition cylinder 39 is provided between the inner and the outer cylinders 37 and 38. A water passage hole 40 and a water passage hole 41 are provided in the upper portion of the partition cylinder 39 and the lower portion of the inner cylinder 37, respectively. Water passage holes 43 are provided in the upper water pumping cylinder 20 at the upper portion of the space 42 between the cylinder 20 and the inner cylinder 37. The lower ends of the upper water pumping cylinder 20, the space 42 and the space 44 between the inner cylinder 37 and the partition cylinder 39 are closed with a closure plate 46. The upper end of the air chamber 34 is closed with a top plate 47.

Figure 6:
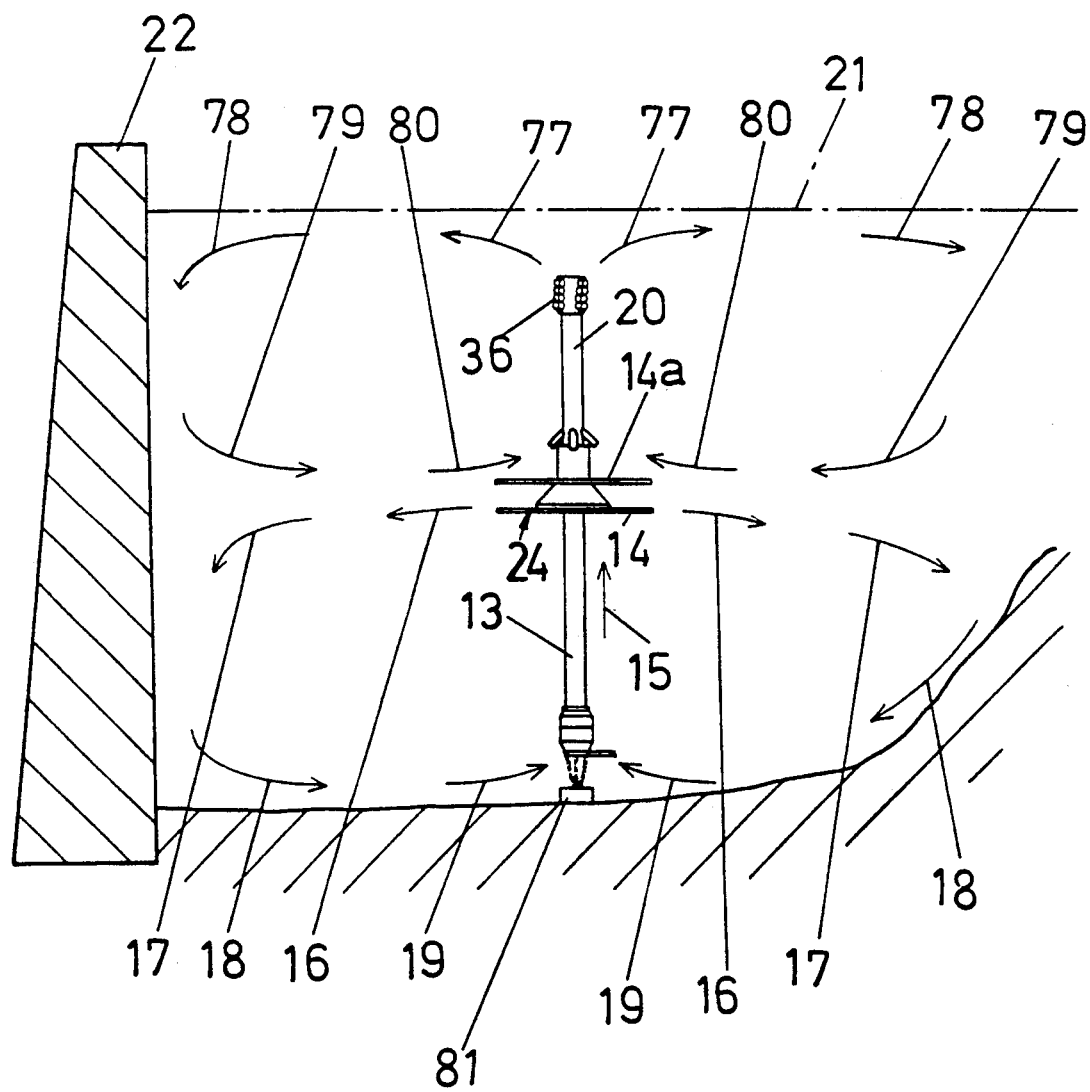
FIG. 6 is a view for decribing the operation of the present invention conducting the upper layer and the lower layer of water respectively.

The operation of the apparatus is described in detail from now on. When the pressurized air is introduced into the air chamber 23 through the air feed hose 56 as shown by an arrow 57 in FIG. 9, the air accumulates in the chamber starting with the upper portions of the spaces 49 and 51 of the chamber 23, to push down the levels of water in the spaces 49, 51. When the levels of water in the spaces 49 and 51 are pushed down to the water passage holes 29 as shown by a chain line 58 in FIG. 9, the pressurized air in the air chamber 23 enters in to the lower water pumping cylinder 13 through the spaces 51, 49 and 30 and the water passage holes 28, 29 and 31 as shown by arrows 59, 60, 61, 62 and 63 in FIG. 9, so that the air forms a large bubble 64. The bubble 64 then ascends in the lower water pumping cylinder 13 as shown by an arrow 65 in FIG. 5, so that the water is sucked into the cylinder through the lower end thereof as shown by an arrow 66. The water is thus pumped up. The large bubble 64 collides against a closure plate 45 so that the bubble breaks into small bubbles which ascend as shown by an arrow 67 in FIG. 5 and accumulate in the air chamber 34. The circulation and diffusion of the water in lower layer is caused as shown in FIG. 6. And the pumped water flows between the guide plates 14 and 14a as shown by arrows 68 in FIG. 10 and diffuses as shown by arrows 69 therein, and flows back as shown by arrows 16, 17, 18 and 19 from near the separator 24 toward the bottom as shown in FIG. 6. Shown at 20, 21 and 22 in FIG. 6 are the upper pumping cylinder, the surface of the large amount of water and an embankment, respectively. The air accumulating in the air chamber 34 pushes down the level of the water therein as shown in FIG. 10 similarly to the other air chamber 23. When the level of the water is pushed down to a position shown by a chain line 70 in FIG. 10, the air is discharged into the upper water pumping cylinder 20 through the spaces 44 and 42 and the water passage holes 40, 41 and 43 as shown by arrows 71, 72 and 73 in FIG. 10, so that the air forms a large bubble 74, which ascends in the cylinder 20 as shown by an arrow 75 in FIG. 7. Water sucked into the upper water pumping cylinder 20 through the water suction pipes 35 as shown by arrows 76 in FIG. 7 is pumped up as shown by an arrow 75 in FIG. 7 and FIG. 8. The pumped water is discharged from the upper end of the upper water pumping cylinder 20 as shown by an arrow 77 in FIGS. 6 and 78, and mixes with the water at and near the surface thereof as the discharged water diffuses and flows back as shown by arrows 78, 79 and 80 in FIG. 6.

In this embodiment, the water quality of upper layer can be improved by the operation of the upper water pumping cylinder and the water quality of lower layer can be improved by the operation of the lower water pumping cylinder, respectively. In generally, in a dam, a lake, a pond or the like having a considerable depth, a quantity of water is considerably different between the upper layer and the lower layer of the water. So, the improvement can be effectively and rationally conducted by controlling the quantity or the concentration of alkaline high concentration water, for example large quantity or more concentrated alkaline water is supplied to lower layer.

The upper and lower water pumping cylinders 20 and 13 are kept upright by a weight 81 and the floats 36.

The water of high alkaline concentration is supplied as shown by an arrow 82 in FIG. 9, so that the water enters into the short cylinder 52 through the small water passage holes 54, mixes with the pumped water and ascends as shown by an arrow 83 in FIG. 9. As a result, the water of high alkaline concentration flows back along with the ascent and diffusion of the pumped water as shown by the arrows 16, 17, 18 and 19 in FIG. 6, so that the water quality in the deep layer of the large amount of water is gradually improved. The water quality of the large amount of water is thus improved.

Although the water of high alkaline concentration is supplied into the lower water pumping cylinder 13 in the embodiment, the present invention is not confined thereto but may be otherwise embodied so that the water of high alkaline concentration is supplied to the upper water pumping cylinder 20 as well if necessary.

Although the intermittent pneumatic water pumping unit in the embodiment is made of the upper and the lower water pumping cylinders, the present invention is not confined thereto but may be otherwise embodied so that the pumping unit is made of a single air and water pumping cylinder or a plurality of air and water pumping cylinders bundled together.

Further, the water of high alkaline concentration in the present embodiment alternatively changed to the water of high oxygen content.

(Embodiment 4)

Figure 11:
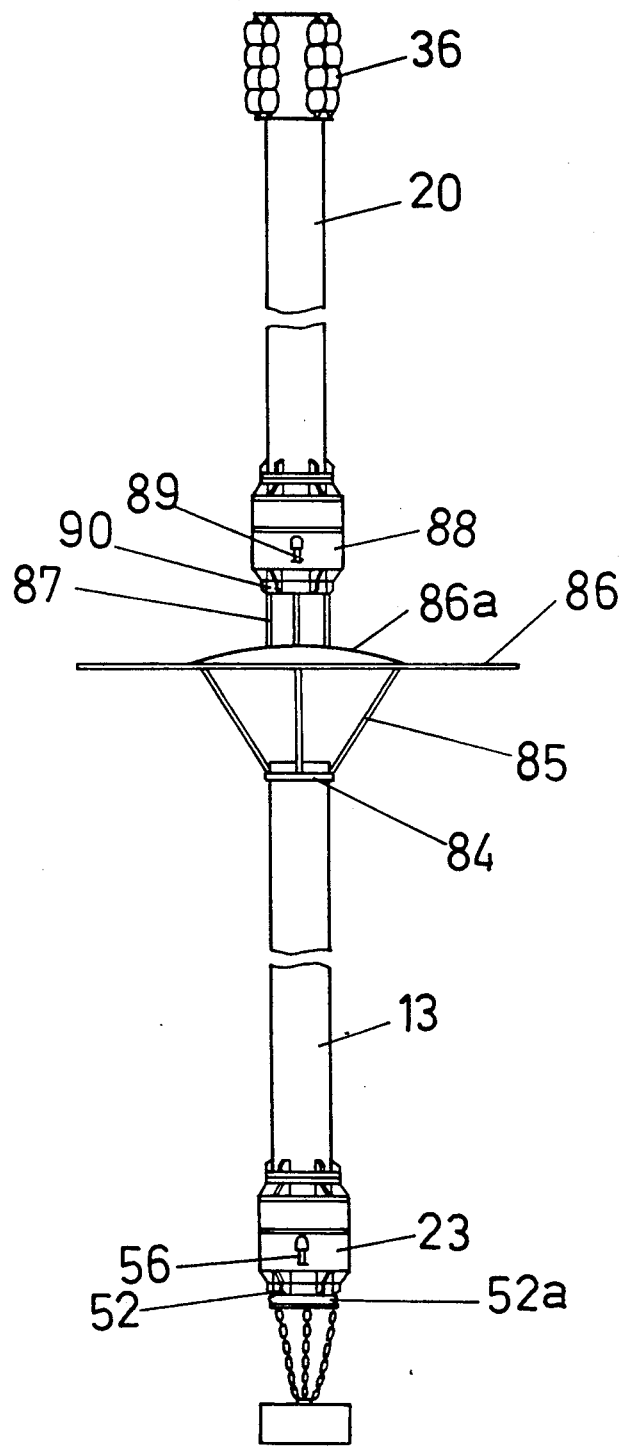
FIG. 11 is a cutaway front view of an intermittent pneumatic water pumping unit in the yet another embodiment of the present invention.

The yet another embodiment of the present invention is hereafter described with reference to FIG. 11. The difference of the embodiment from the embodiment 3 is that the air chamber is equipped with the upper intermittent pneumatic water pumping unit and the lower intermittent pneumatic water pumping unit respectively, and a pressurized air is supplied intermittently to the upper and lower unit from each individual air chamber respectively. So that the upper and lower air chambers 88 and 23 of the intermittent pneumatic water pumping unit in this embodiment are the same as each other in constitution. Therefore, two intermittent pneumatic water pumping units which have same constitution are combined in vertically through a separator. In the embodiment 4, the lower air chamber 23 is provided outside the lower portion of a lower water pumping cylinder 13, a short cylinder 52 is connected to the lower end of the lower water pumping cylinder 13, and a high alkaline concentration water feeder 52a for supplying water of high alkaline concentration to the short cylinder 52 is provided. A ring 84 is secured to the upper end of the lower water pumping cylinder 13. A number of support rods 85 extend upward from the ring 84 and support a guide plate 86 on the upper ends of the rods. The guide plate 86 has a central projecting portion 86a. A number of support legs 87 are provided along a circle on the projecting portion 86a. A short cylinder is coupled to the upper ends of the support legs 87 and connected to the lower end of an upper water pumping cylinder 20. The air chamber 88 is provided at the lower end of an upper water pumping cylinder 20. Air feed hoses 56 and 89 are connected to the air chambers 23 and 88, respectively, to supply pressurized air continuously thereto so that air bubbles are intermittently discharged from the air chambers into the upper and the lower water pumping cylinders 20 and 13, respectively, and ascend therein. As a result, water is pumped up.

So the circulation and diffusion in the large amount of water is caused at the upper layer and at the lower layer respectively defined by the horizontal level of separator 86. The circulation and diffusion of mixed water pumped by upper and lower intermittent pneumatic water pumping unit is described as same as Embodiment 4 and as shown in FIG. 6.

Although the high alkaline concentration water feeders 52a and 90 are provided at the lower ends of the air chambers 23 and 88, respectively, in the embodiment 3, the present invention is not confined thereto but may be otherwise embodied so that the feeders are provided at the middle-height portions of the lower and the upper water pumping cylinders 13 and 20 to supply water of high alkaline concentration into the middle-height portions of water pumping cylinders.

Further, the water of high alkaline concentration in the present embodiment alternatively changed to the water of high oxygen content.

Although the intermittent pneumatic water pumping unit in this embodiment is made of a single water pumping cylinder, the present invention is not confined thereto but may be otherwise embodied so that the pumping unit is made of water pumping cylinders bundled together or a multi state unit of more than two stages to four stages.

(Embodiment 5)

Figure 12:
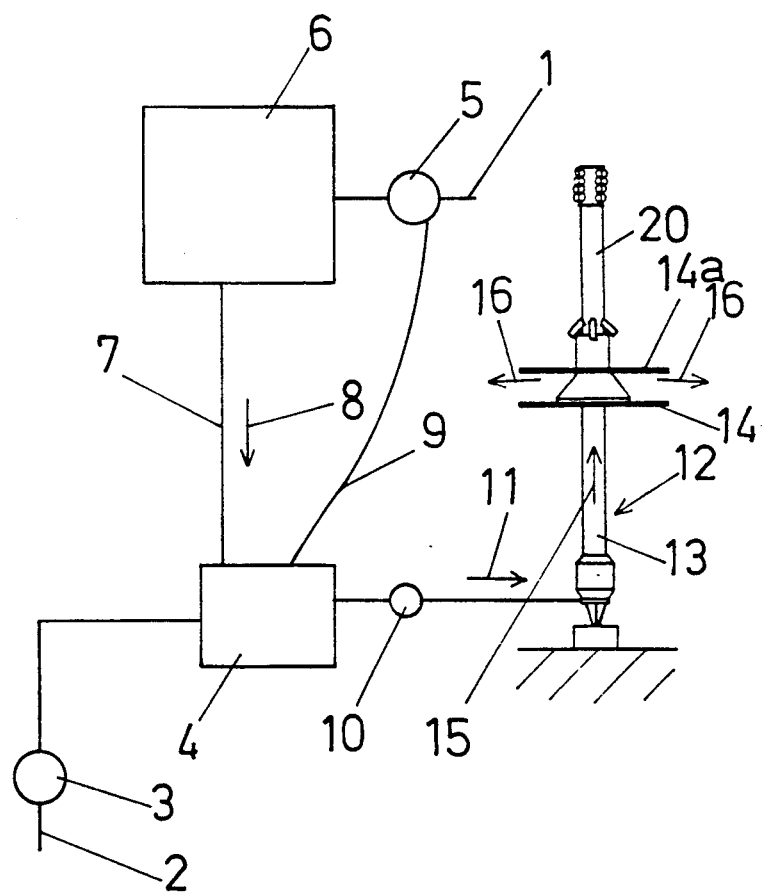
FIG. 12 is a diagrammatic view for describing the supply of high-oxygen-content water in an embodiment of the present invention.

Yet another embodiment of the present invention is hereafter described with reference to FIGS. 12, 13, 14, 15 and 16. In an apparatus which is the embodiment and is for improving the quantity of dissolved oxygen in a large amount of water, FIG. 12 shows a diagram describing the high-oxygen-content water supply, some of the water is pumped up from a large amount of water to be processed to a water processing vessel 4 through a water take pipe 2 by a pump 3, and air is supplied to an air processing vessel 6 by a pump 5. Nitrogen is adsorbed from the air in the air processing vessel 6 so that the air is changed into air of high oxygen content such as 80%. The air of high oxygen content is supplied, under pressure, from the air processing vessel 6 to the water processing vessel 4 through an air feed pipe 7 as shown by an arrow 8 in FIG. 12. A portion of the air, which is supplied to the air processing vessel 6, is obtained through a suction pipe 1 for the pump 5, and the other portion of the air is obtained through an air passage pipe 9 from the water processing vessel 4. In the vessel 4, the air of high oxygen content and drops of the water are put into contact with each other in a conventional manner so that the oxygen of the air is dissolved into the drops of the water to change the water into water of high oxygen content such as 40 mg/l. After the dissolution of the oxygen, the remaining air is sent back to the suction side of the pump 5 through the air passage pipe 9. The water of high oxygen content is sent, under pressure, to the lower portion of an intermittent pneumatic water pumping unit 12 by a pump 10 as shown by an arrow 11 in FIG. 12, so that the water is mixed with pumped water. For example, when water of high oxygen content of 40 mg/l is sent by 5 tons per minute to the lower portion of the pumping unit 12 and mixed with the pumped water, 40 tons of water of 5 mg/l in oxygen content is obtained. In that case, the quantity of dissolved oxygen in 2,400 tons of water per hour or in 77,600 tons of water per day is improved. The water pumped up by the pumping unit and contains the high oxygen content water is circulated and diffused in the large amount of water as shown in FIG. 6. The water of high oxygen content is applied to the lower portion of the lower water pumping cylinder 13 of the pumping unit 12 as shown by the arrow 11 in FIG. 12, ascends together with the pumped water as shown by an arrow 15, is discharged in between guide plates 14 and 14a, and circulatively flows in the deep layer of the large amount of water as shown by arrows 16, 17, 18 and 19 in FIG. 6, so that the quantity of dissolved oxygen in the deep layer is improved. The operation of this embodiment is hereafter described with reference to FIGS. 13, 14, 15 and 16. In the embodiment, water of no oxygen content in a lake 91 is pumped up to a water processing vessel 4 through a water intake pipe 2 by a pump 3, as shown in FIG. 14. Air is supplied to an air processing vessel 6 by a pump 5. In the air processing vessel 6, nitrogen is absorbed from the air so that the air is changed into air of high oxygen content such as 80%. The air of high oxygen content is introduced, under pressure, into the water processing vessel 4 as shown by an arrow 92. In the water processing vessel 4, the air of high oxygen content and drops of the water are put into contact with each other in a conventional manner so that the oxygen of the air is dissolved into the water drops. The water is thus quickly changed into water of high oxygen content such as 40 mg/l. After the dissolution, the remaining air is sent back to the suction side of the pump 5. The water of high oxygen content is sent, under pressure, to a water dispersion pipe 95 by a pump 93 as shown by an arrow 94 in FIG. 14, and is dispersed from the pipe, so that the water quickly mixes with low-oxygen-content water flowing into the lake 91 as shown by an arrow 96 in FIG. 14. For example, when the low-oxygen-content water flows by 80 tons per second into the lake 91 and has an average oxygen content of 0.5 mg/l and the water of high oxygen content is dispersed by 10 tons per second from the dispersion pipe 95, the oxygen content of all the water flowing into the lake 91 is changed to about 5 mg/l. Since the low-content-oxygen water flowing into the lake 91 usually flows to the central portion thereof along the bottom of the lake as shown by arrows 97 and 98 in FIG. 13, a large number of intermittent pneumatic water pumping units 99, 99a and 99b are alternately disposed in three rows and operated respectively so that upward and downward water flows are caused around each of the pumping units. As a result, the low-oxygen content water flowing into the lake 91, saturated-oxygen-content water at and near the surface of the lake and no-oxygen-content or low-oxygen-content water in the intermediate-depth layer of the lake are mixed with each other so that they are all changed into processed and improved water of prescribed oxygen content.

Figure 13:
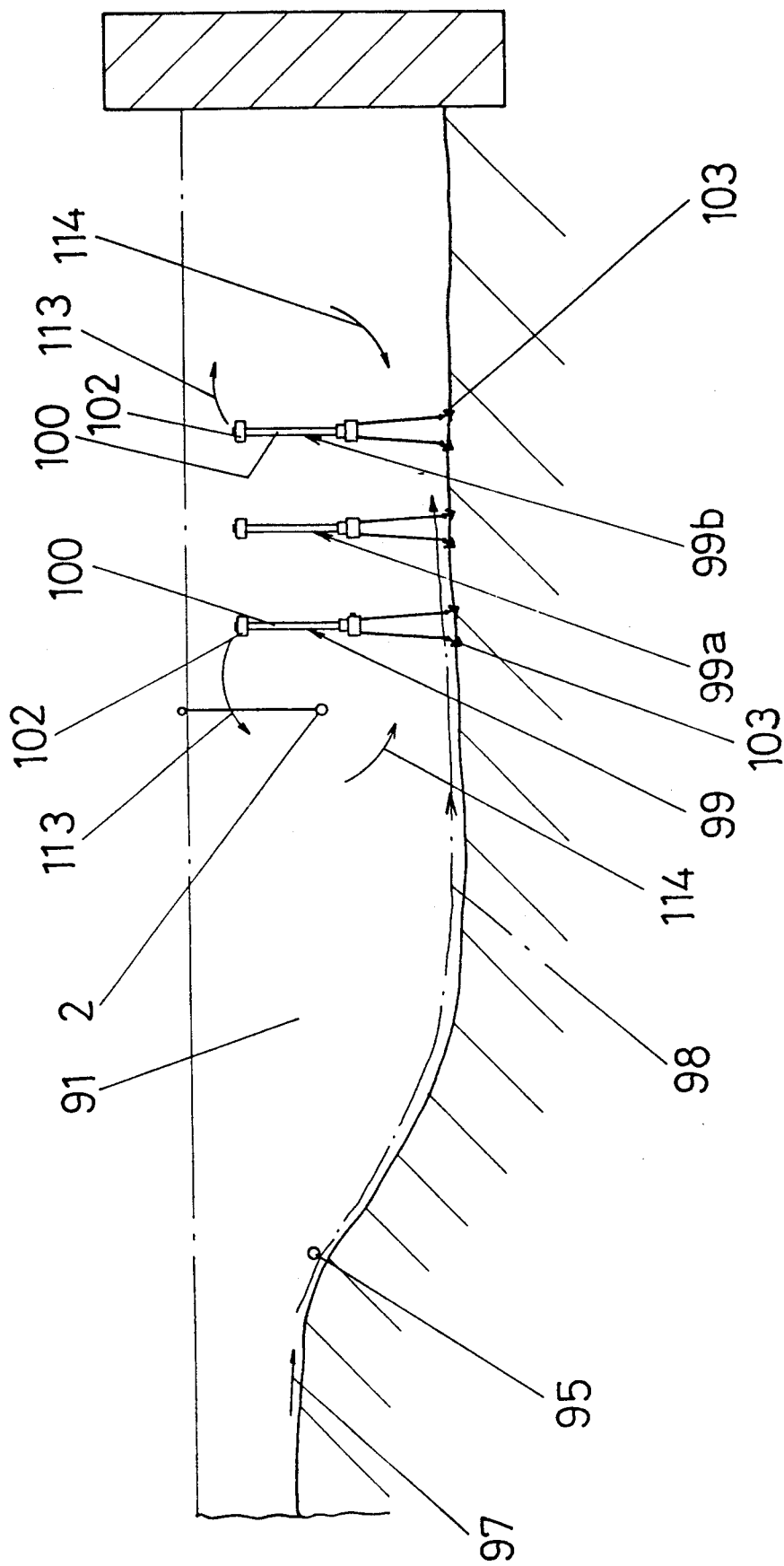
FIG. 13 is a view for describing the operation of the yet another embodiment of the present invention.
Figure 14:
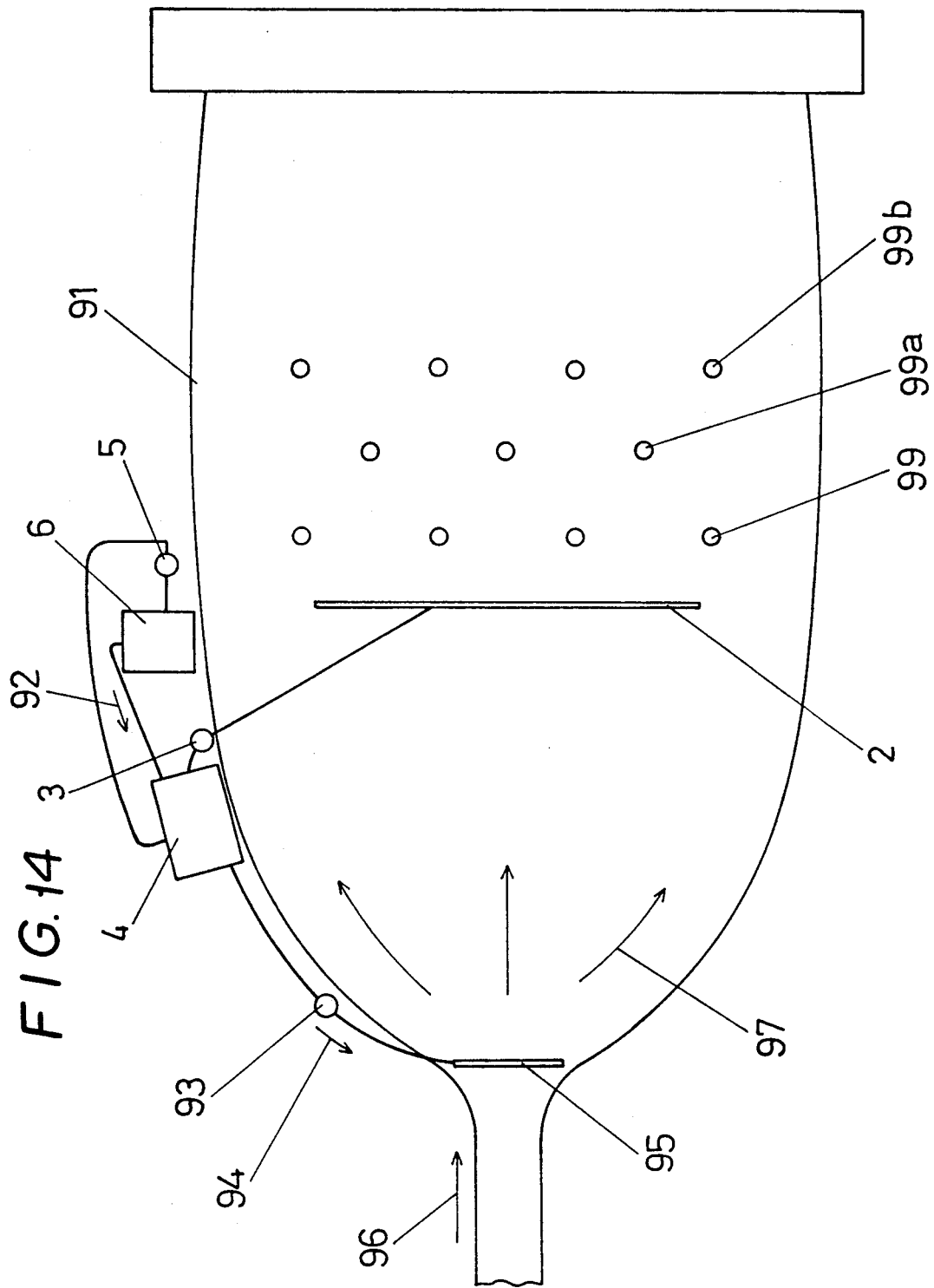
FIG. 14 is a plan view of the embodiment shown in FIG. 13.
Figure 15:
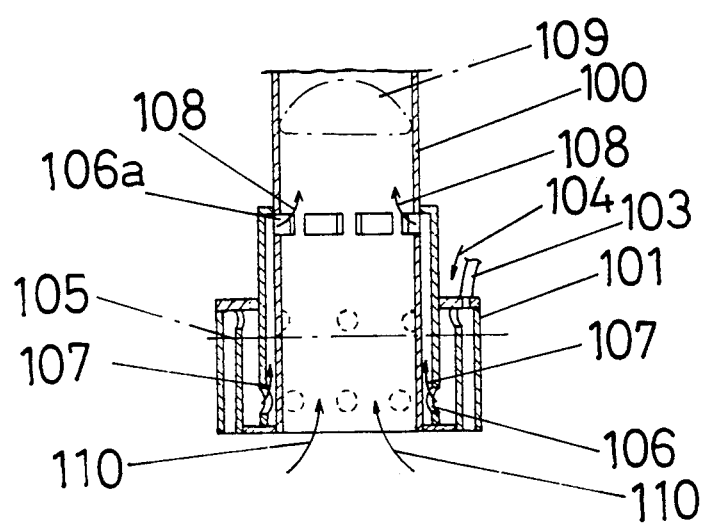
FIG. 15 is an enlarged sectional view of a major part of an intermittent pneumatic water pumping unit in the embodiment shown in FIG. 13.
Figure 16:
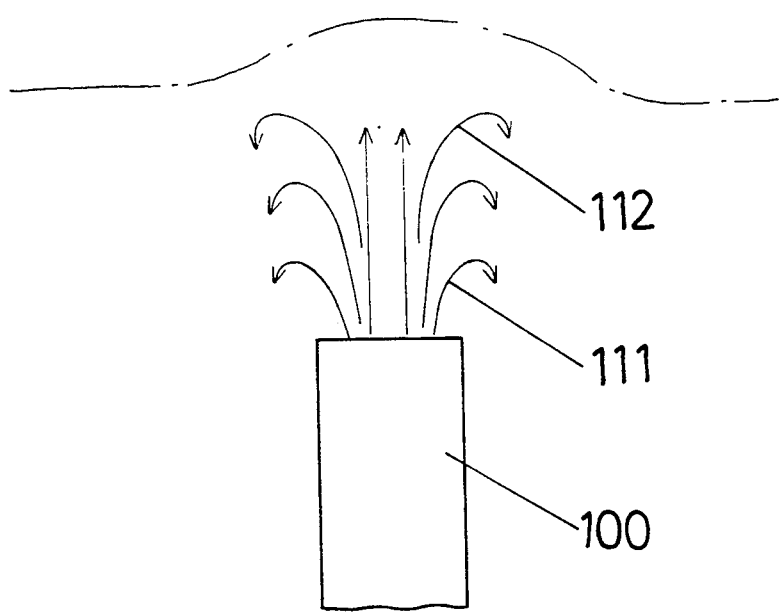
FIG. 16 is a view for describing the state of water pumping in the embodiment shown in FIG. 13.

Each of the intermittent pneumatic water pumping units 99, 99a and 99b includes a water pumping cylinder 100, an air chamber 101, a float 102, and a fastening member 103 such as an anchor, as shown in FIGS. 13 and 15. Although the water pumping cylinder 100 is a single cylinder, it may be substituted by a plurality (two to ten and several) of single cylinders bundles together or be substituted by a combination of an upper and a lower water pumping cylinder. If the water pumping cylinder 100 is made of four mutually bundled cylinders each having a diameter of 70 cm, the cross-sectional area of the water pumping cylinder is 1.5 m². If water is pumped up at the rate of 1.5 m per second through the water pumping cylinder 100 made of the four mutually bundled cylinders, the water is pumped up by about 200,000 tons per day. If thirty water pumping cylinders each made of such four mutually bundled cylinders are installed, water is pumped up by about 6,000,000 tons per day or by about 500,000,000 tons in eighty days. However, since the pumped water mixes with water about ten times as much as the former in reality, the pumped water may be less than the above-mentioned quantity. In each of the intermittent pneumatic water pumping units, pressurized air is introduced, under pressure, into an air chamber 101 through an air feed hose 103 as shown by an arrow 104 in FIG. 15, to push down the level 105 of water in the air chamber. When the level 105 of water is pushed down to water passage holes 106, the air enters into the water pumping cylinder 100 through the water passage holes 106 and 106a as shown by arrows 107 and 108 in FIG. 15, so that the air forms a large bubble 109, which ascends in the cylinder to push up or suck up the water therein. For that reason, the water around the lower end of the water pumping cylinder 100 is also sucked up into it as shown by arrows 110 in FIG. 15, so that the water is pumped up to the surface of the lake 91. The water pumped up to the surface of the lake 91 mixes quickly with the water between the upper end of the water pumping cylinder 100 and the surface of the lake. Since the speed of the pumped water in the cylinder 100 decreases from the central portion of the cylinder 100 toward the peripheral portion thereof in a diametrical direction, the water ascends therein to receive external forces which cause the water to curve outward from the upper end of the cylinder as shown by arrows 111 and 112 in FIG. 16. For that reason, the pumped water going out of the cylinder 100 mixes quickly with water around the cylinder. Since the difference between the specific gravity of the water at and near the bottom of the lake 91 and that of the water at and near the surface thereof is decreased by the quick mixing of the pumped water with the other water, the mixed water diffuses without quickly descending, so that the mixed water can often spread by several hundred meters to several thousand meters around from the water pumping cylinder 100. However, if the water pumping units 99, 99a and 99b are alternately disposed at intervals of 100 m each, the mixed water spreads by about a half of the interval from each water pumping cylinder due to mutual interference. For that reason, the mixed water performs upward and downward flows as shown by arrows 113 and 114 in FIG. 13.

Also, the high-oxygen-content water may alternatively changed to the water of high alkaline concentration to improve the water quality by adjusting the pH level.

(Embodiment 6)

Figure 17:
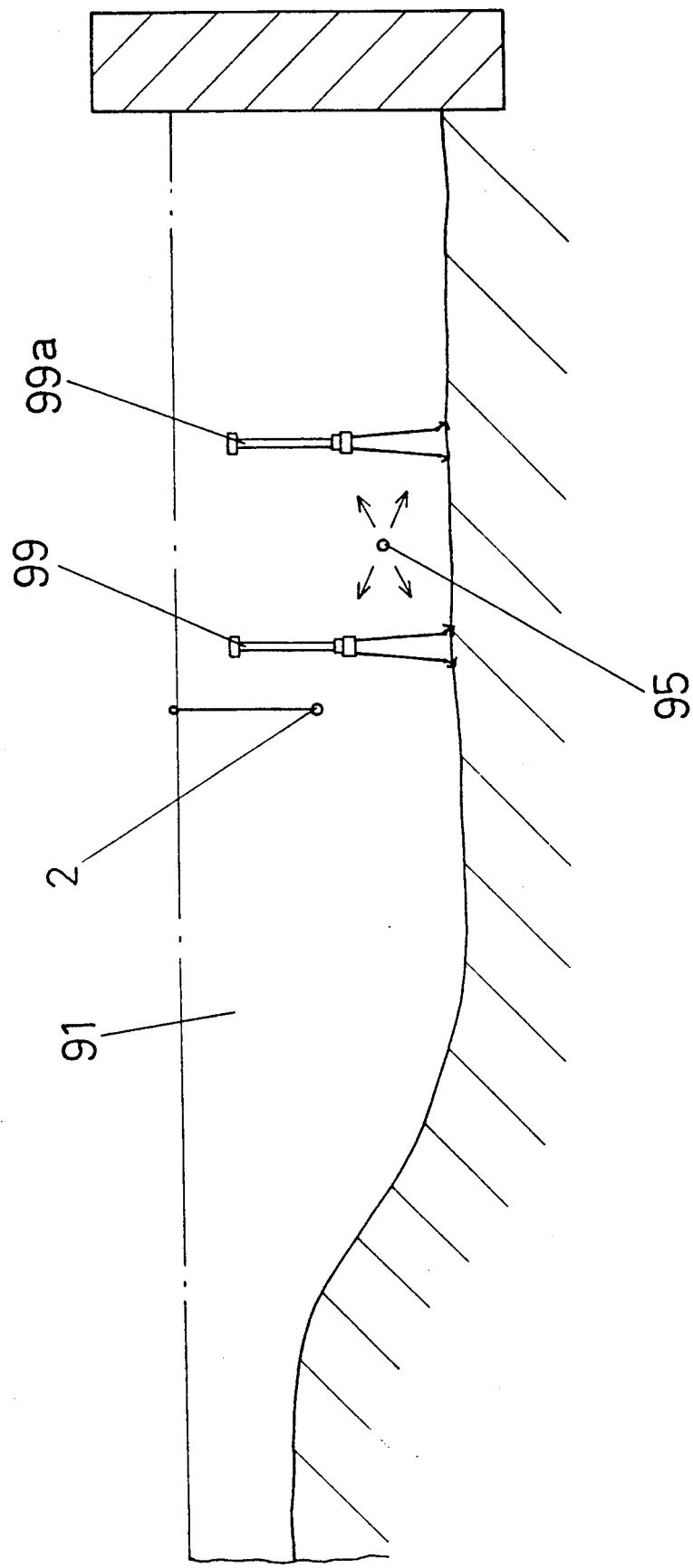
FIG. 17 is a view for describing the operation of the yet another embodiment of the present invention.
Figure 18:
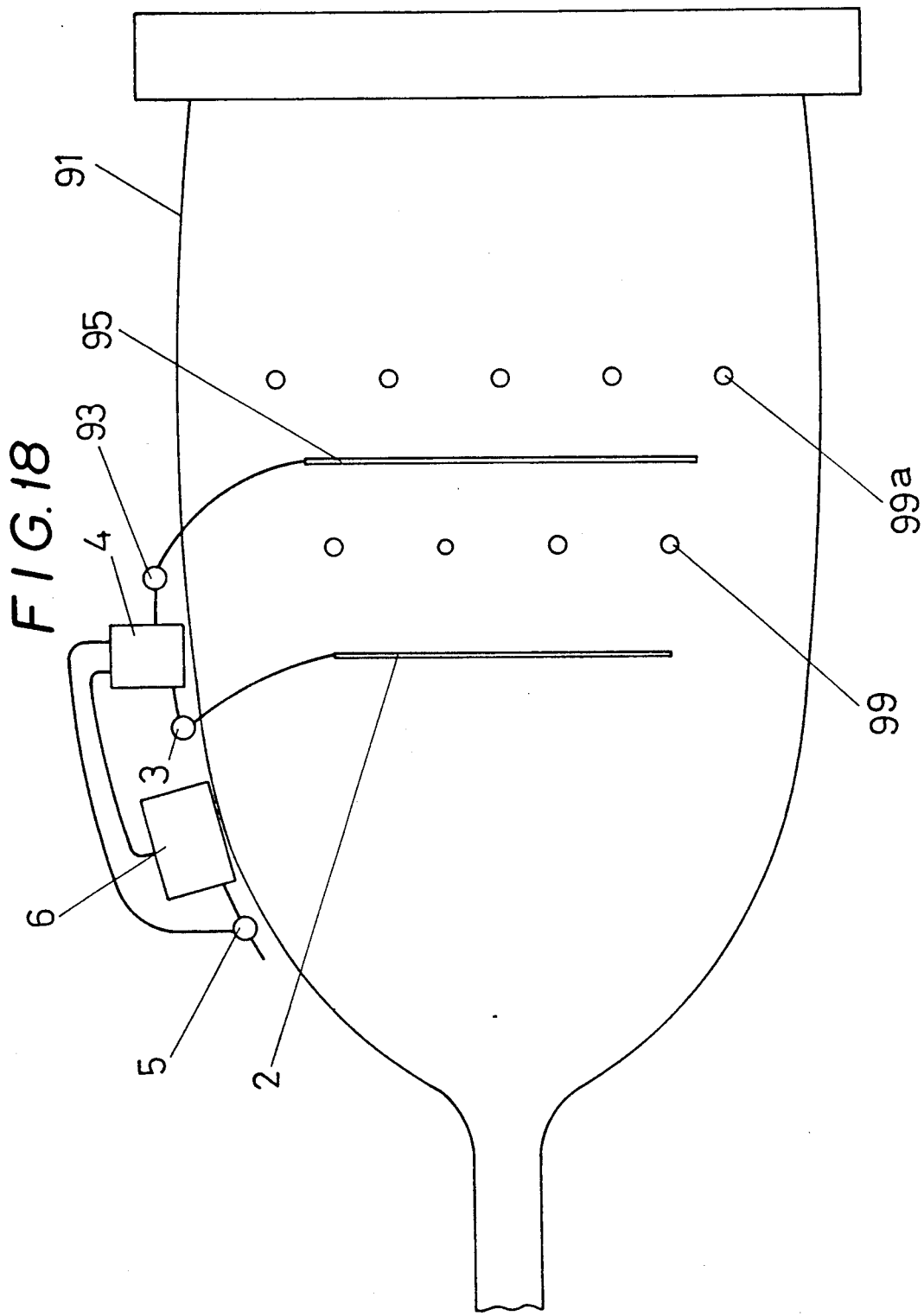
FIG. 18 is a plan view of the embodiment shown in FIG. 17.

Yet another embodiment of the present invention is hereafter described with reference to FIGS. 17 and 18. Although the water of high oxygen content is mixed with the water flowing into the lake 91 and the water is flowed and circulated up and down by an intermittent pneumatic water pumping unit to increase the quantity of dissolved oxygen in all the water of the lake in the embodiment 5, water of high oxygen-content is released into water at the bottom of the lake 91 and the mixed water is subjected to upward and downward flows by an intermittent pneumatic water pumping units to increase the quantity of dissolved oxygen in all the water of the lake in the embodiment 6. In this embodiment, a water intake pipe 2 and a water dispersion pipe 95 are provided near the bottom of the lake 91, and no-oxygen-content water sucked into the intake pipe is sent to a water processing vessel 4 by a pump 3. Air of high oxygen content of about 80% is supplied into the vessel 4 so that oxygen is dissolved into the no-oxygen-content water. The no-oxygen-content water is thus changed into water of high oxygen content of 40 mg/l. The water of high oxygen content is sent back to the bottom of the lake through the water dispersion pipe 95 by a pump 93. Intermittent pneumatic water pumping units 99 and 99a cause the water to perform upward and downward flows for efficient agitation to uniformize the quantity of dissolved oxygen in all the water of the lake 91, similarly to the embodiment 5.

Also, the high-oxygen-content water may alternatively changed to the water of high alkaline concentration.

(Embodiment 7)

Figure 19:
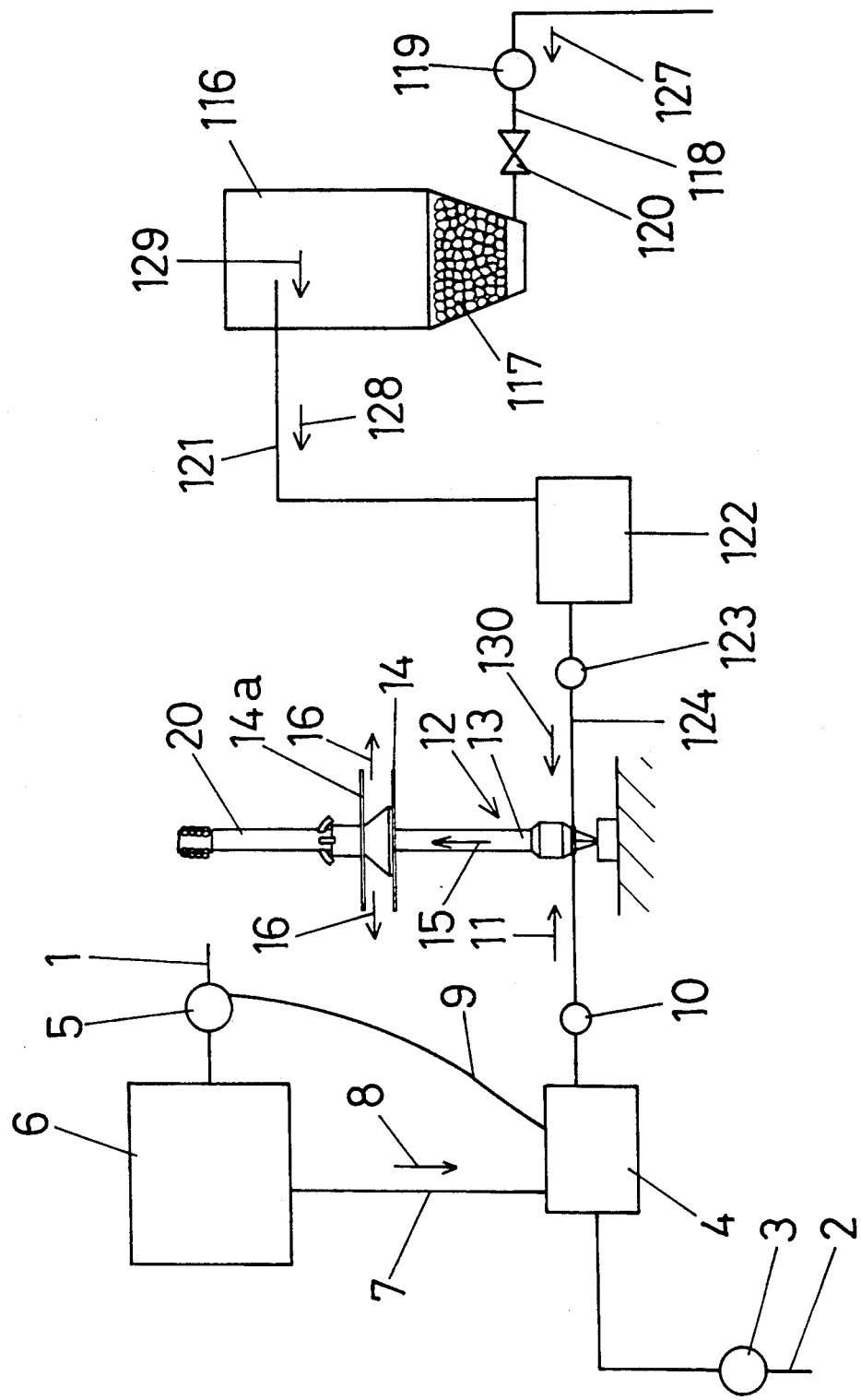
FIG. 19 is a diagrammatic view for describing the supply of alkaline high concentration water and high-oxygen-content water in yet another embodiment of the present invention.

Yet another embodiment of the present invention is hereafter described with reference to FIG. 19. In the embodiment, water of high oxygen content and/or and water with slaked lime dissolved therein can be supplied to the water pumping cylinder of an intermittent pneumatic water pumping unit, depending on the quantity of dissolved oxygen in processed water and the pH level and quality thereof, so that the water of high oxygen content and/or the water with the slaked lime dissolved therein mixes with pumped water. The equipment in this embodiment is descried above as to the embodiments 1, 3, 4, 5 and 6.

What is claimed is:

1. A method of improving the quality of a body of water which comprises:
   a. dissolving slaked lime in water;
   b. pumping said water with slaked lime dissolved therein into said body of water by an intermittent pneumatic pumping unit vertically disposed within said body of water, said pumping unit comprising at least one cylinder which intermittently generates bubbles of a diameter which is substantially that of said cylinder by introducing air into said pumping unit, to diffuse and circulate said water with slaked lime dissolved therein in said body of water by the rising action of said bubbles, to adjust the pH level of said body of water.

2. The method according to claim 1 wherein pH level of the body of water is adjusted in proximity to the surface or bottom or both of said body of water.

3. The method according to claim 1 wherein said body of water is a water in a dam, reservoir, pond, lake, marsh, moat or river.

4. The method according to claim 1 wherein said body of water contains phosphorus dissolved therein and whereby a calcium and phosphorus compound is produced by reaction of the dissolved phosphorus with calcium from the slaked lime, to form an insoluble deposit, thereby eliminating phosphorus from said body of water and adjusting the pH level of said body of water.

5. The method according to claim 1 wherein water containing oxygen dissolved therein is introduced into said body of water by said pumping unit, whereby water with slaked lime and oxygen is dissolved in said body of water, to thereby adjust the pH level of said body of water and to increase the oxygen content of said body of water.

6. The method according to claim 5 wherein the pH level of the body of water is adjusted and the quantity of dissolved oxygen in said body of water is increased in proximity to the surface or bottom or both of said body of water.

7. The method according to claim 5 wherein said body of water contains phosphorus dissolved therein and whereby the dissolved phosphorus is eliminated from said body of water by reaction with the slaked lime, the pH level of said body of water is adjusted and the quantity of dissolved oxygen in said body of water is increased.

* * * * *